(12) United States Patent
Kwon et al.

(10) Patent No.: US 7,961,783 B2
(45) Date of Patent: Jun. 14, 2011

(54) METHODS AND SYSTEMS FOR RATE CONTROL IN VIDEO ENCODER

(75) Inventors: Do-Kyoung Kwon, Kyunggi (KR);
Meiyin Shen, Kao-Hsiung (TW);
Chung-Chieh Kuo, Taipei (TW)

(73) Assignee: Mediatek Incorporation,
Science-Based Industrial Park,
Hsin-Chu, Hsien (TW)

( * ) Notice: Subject to any disclaimer, the term of this patent is extended or adjusted under 35 U.S.C. 154(b) by 1741 days.

(21) Appl. No.: 11/160,765

(22) Filed: Jul. 7, 2005

(65) Prior Publication Data
US 2007/0009026 A1 Jan. 11, 2007

(51) Int. Cl.
*H04N 11/04* (2006.01)
*H04N 7/12* (2006.01)
(52) U.S. Cl. .............................. 375/240.03; 375/240.26
(58) Field of Classification Search .................. 348/409, 348/405, 404, 419, 242, 415, 402, 403, 406, 348/410, 411, 412, 413, 414; 382/190, 232, 382/236, 238, 239, 242, 243, 248, 251; 375/240.03, 375/240.26, 240.24, 240.16, 240.12
See application file for complete search history.

(56) References Cited

U.S. PATENT DOCUMENTS

| | | | | |
|---|---|---|---|---|
| 5,969,764 | A * | 10/1999 | Sun et al. ................... | 375/240.06 |
| 2003/0152151 | A1* | 8/2003 | Hsieh et al. ............... | 375/240.26 |
| 2004/0013202 | A1* | 1/2004 | Lainema ................... | 375/240.18 |
| 2004/0114817 | A1* | 6/2004 | Jayant et al. .............. | 382/239 |
| 2004/0264571 | A1* | 12/2004 | Zhang et al. .............. | 375/240.16 |
| 2007/0147512 | A1* | 6/2007 | Eckart ....................... | 375/240.24 |

OTHER PUBLICATIONS

IEEE, Bo Xie and Wenjun Zeng, Sequence Based Rate Control for Constant Quality Video, 2002, 77-80.*
U.S. Appl. No. 11/047,039, filed Jan. 31, 2005, Do-Kyoung Kwon.
J. Ribas-Corbera, S. Lei., Rate Control in DCT Video Coding for Low-Delay Communications., IEEE Trans. Circuits and Syst. Video Technol., 1999, pp. 172-185, vol. 9, No. 1.
P. Yin, J. Boyce., A New Rate Control Scheme for H.264 Video Coding., 2004 IEEE, pp. 449-452, NJ., USA.
Z. G. Li, F. Pan, K. P. Lim, S. Rahardja, Adaptive Rate Control for H.264., 2004 IEEE, pp. 745-748, Singapore.
Ning Wang, Yun He., A New Bit Rate Control Strategy for H.264., 2003 IEEE, Dec. 15-18, 2003, pp. 1370-1374, Singapore.
Jianfeng Xu, Yun He., A Novel Rate Control for H.264., 2004 IEEE, pp. 809-812, Beijing, China.
Z. G. Li, F. Pan, K. P. Lim, G. N. Feng, X. Lin, S. Rahardha, D. J. Wu., Adaptive Frame Layer Rate Control for H.264, 2003 IEEE, pp. 581-584, Singapore.
Debargha Mukherjee, Sanjit K. Mitra, Combined Mode Selection and Macroblock Quantization Step Adaptation for the H.263 Video Encoder., 1997 IEEE, pp. 37-40, CA., USA.

* cited by examiner

*Primary Examiner* — Behrooz Senfi
(74) *Attorney, Agent, or Firm* — Winston Hsu; Scott Margo

(57) ABSTRACT

A method of rate control in a video encoder includes performing a first encoding step to encode macroblocks of a current frame by utilizing a first quantization parameter to thereby generate a residual signal for the current frame; estimating a number of header bits for each macroblock mode to thereby estimate a total number of header bits for the current frame; estimating an available number of texture bits according to the total number of header bits for the current frame; determining a second quantization parameter according to the estimated available number of texture bits; and performing a second encoding step to encode the residual signal for the current frame by utilizing the second quantization parameter.

36 Claims, 18 Drawing Sheets

METHODS AND SYSTEMS FOR RATE CONTROL IN VIDEO ENCODER

BACKGROUND

The invention generally relates to rate control for block-based video encoders, and in particular to methods and systems for performing frame-layer or macroblock-layer rate control in H.264 video encoders.

Various video compression standards have been developed for a wide range of applications such as video telephony, video conferencing, and video streaming. These video coding standards typically involve techniques including discrete cosine transform (DCT), motion estimation (ME) or motion compensation (MC), quantization, and variable length coding (VLC). A quantization parameter (QP), which corresponds to a quantization step-size, can be adaptive during the quantization process and is an important encoding parameter that has a large effect on the quality of resulting encoded video. The quantizer step-size used for a frame or a macroblock (MB) impacts the encoded video quality, and an appropriate rate control algorithm should be utilized to determine the quantizer step-size for a given application and coding environment. That is, the QP value should be continually determined carefully for a given application and video compression standard.

Due to its importance, although not strictly belonging to the scope of standard, rate control has been studied extensively by many researchers. Recently, the H.264 video compression standard has received much attention due to its improved coding efficiency. Accordingly, finding an efficient rate control algorithm for use by H.264 encoders has become an important topic for the practical usage of H.264 with various transmission channels, and several model-based rate control algorithms have been proposed for H.264.

The rate and distortion (R-D) optimized motion estimation and mode decision (also referred to as RDO) with various intra and inter prediction modes and multiple reference frames is a major contributor to the high coding efficiency of H.264 compared with previous video compression standards. However, rate control (RC) of H.264 is complicated due to the inter-dependency between the RDO and RC. That is, RC is utilized to determine a QP value, and the QP value is utilized by the RDO to determine the necessary information for RC. This issue of which parameter to determine first is sometimes referred to as the chicken and egg dilemma and is identified in "Adaptive frame layer rate control for H.264" by Z. G. Li, F. Pan, K. P. Lim, G. N. Feng, S. Rahardja and D. J. Wu, in Proc. IEEE Intl. Conf. Multimedia and Expo, pp. 581-584, June 2003; and "Adaptive rate control for H.264" by Z. G. Li, F. Pan, K. P. Lim, and S. Rahardja, in Proc. IEEE Intl. Conf. Image Processing, pp. 745-748, October 2004.

In both documents mentioned above, the mean absolute difference (MAD) of each basic unit in a current frame is estimated according to the MAD of the collocated basic unit in a previous frame using a linear model. Then, a quadratic rate model is employed to determine the QP of the basic unit, which could be a frame, a slice, or a macroblock (MB). In "A new rate control scheme for H.264 video coding" by P. Yin and J. Boyce, in Proc. IEEE Intl. Conf. Image Processing, pp. 449-452, October 2004, the variance of the residual signal is estimated after performing the RDO with a reduced set of MB partitions and reference frames. The estimated variance is fed into the H.263 TMN8 R-D models described in "Rate control in DCT video coding for low-delay communications," by J. Ribas-Corbera and S. Lei, IEEE Trans. Circuits and Syst. Video Technol., vol. 9, pp. 172-185, February 1999, to determine the QP values of MBs.

While the estimation methods in many existing algorithms may work for stable video sequences, the accuracy cannot be guaranteed when video sequences contain frames with variable characteristics, for which the rate control performance decreases due to inaccurate estimation of MAD and variance of the residual signal. An improved method of performing frame rate control in H.264 video encoders would be greatly beneficial.

SUMMARY

An improved frame-layer rate control method having an estimated number of header bits being determined for each macroblock class is provided to address the above-mentioned problems.

According to an exemplary embodiment of the rate control methods, a rate control method implemented in a video encoder comprises performing a first encoding step to encode macroblocks of a current frame by utilizing a first quantization parameter to thereby generate a residual signal for the current frame; estimating a number of header bits for each macroblock mode to thereby estimate a total number of header bits for the current frame; estimating an available number of texture bits according to the total number of header bits for the current frame; determining a second quantization parameter according to the estimated available number of texture bits; and performing a second encoding step to encode the residual signal for the current frame by utilizing the second quantization parameter.

According to another exemplary embodiment of the claimed invention, a system for performing rate control in a video encoder comprises a first step encoding device being coupled to an incoming video source for performing a first encoding step to encode macroblocks of a current frame by utilizing a first quantization parameter to thereby generate a residual signal for the current frame; a rate control device being coupled to the first step encoding device for estimating a number of header bits for each macroblock mode to thereby estimate a total number of header bits for the current frame, estimating an available number of texture bits according to the total number of header bits, and determining a second quantization parameter according to the estimated available number of texture bits; and a second step encoding device being coupled to the rate control device for performing a second encoding step to encode the residual signal for the current frame by utilizing the second quantization parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
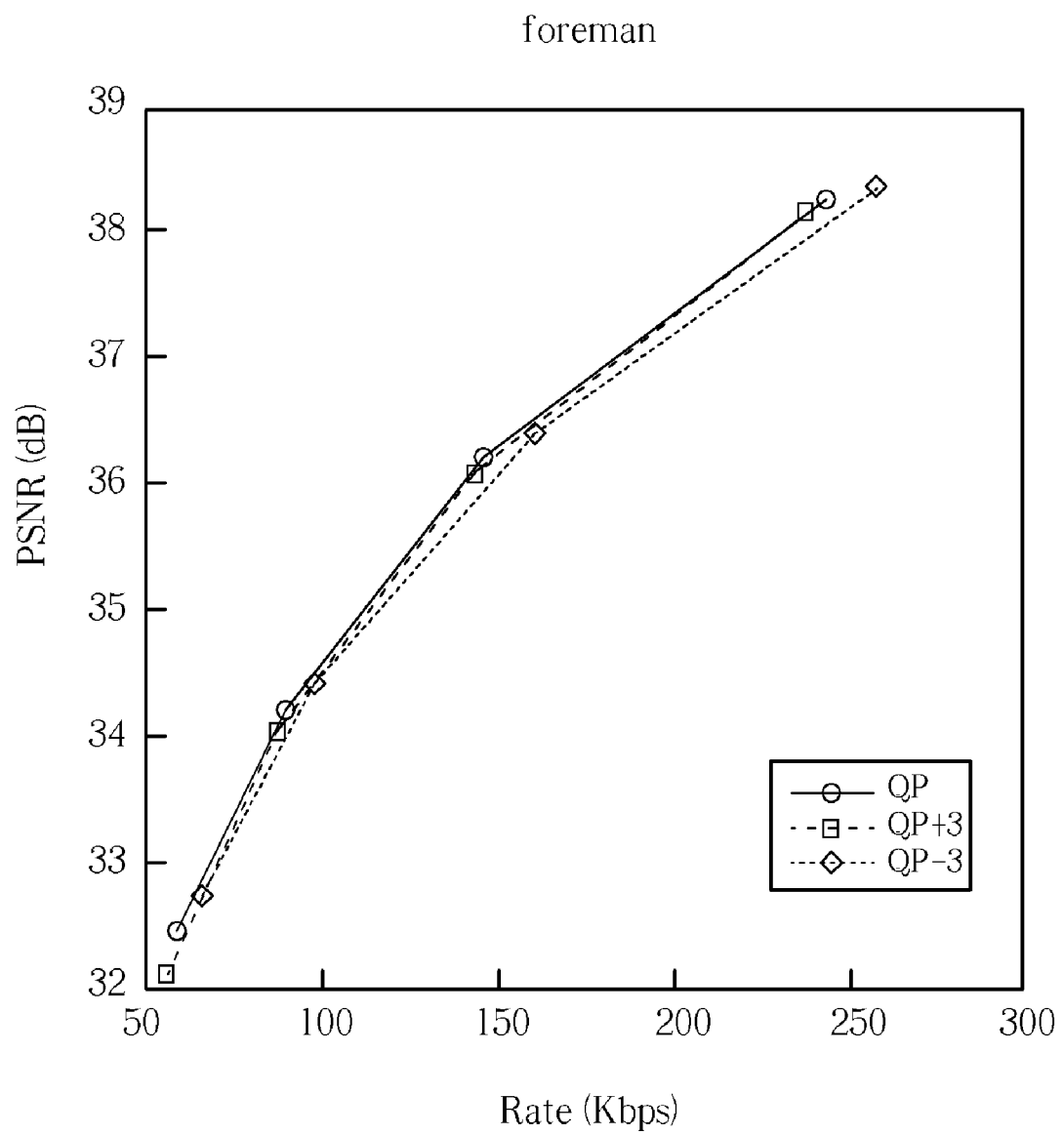
FIG. 1 is an R-D curve for the QCIF "foreman sequence with five reference frames having values of $QP_2$ differing from that of $QP_1$ by a value of 3.

In H.264 rate control, there are two major problems caused by the inter-dependency between the rate and distortion optimization (RDO) and the rate control (RC) process. Firstly, as addressed in the related art documents and their associated algorithms, the residual signal and its related information such as mean absolute difference (MAD) and variance are not available before the RDO is performed. Secondly, the header information such as macroblock (MB) modes, motion vectors (MVs) and reference frames are also not known before the RDO is performed. As a result, the number of header bits required for encoding the header information cannot be accurately estimated. Moreover, when encoding at low bit rates, the number of header bits takes a large portion of the total number of bits due to various MB modes and multiple reference frames are employed. These header bits may also vary significantly from MB to MB and from frame to frame. Therefore, accurately estimating the number of header bits is actually as important as estimating the number of texture bits in the model-based rate control algorithm for the H.264 encoders. The problem of estimating header bits has not been addressed in the related art. In fact, most rate control algorithms for H.264 encoder only focus on how to estimate the MAD and/or the variance of the residual signal without performing the RDO.

In U.S. patent application Ser. No. 11/047,039, entitled "Video Encoding Methods and Systems With Frame-Layer Rate Control", filed on Jan. 31, 2005 by the same inventor and incorporated herein by reference, a frame-layer rate control algorithm based on a two-step encoding scheme is described. As explained, the two-step encoding scheme resolves the problems caused by the RDO-RC inter-dependency.

In some embodiments, the RDO for all MBs in a current frame is performed using the quantization parameter (QP) of the previous frame, and the residual signals of the MBs are later encoded using a new QP obtained by a rate model having optimized header bit estimation. A better estimation for the number of header bits improves the accuracy of rate control. In particular, a MB-layer rate control algorithm based on a two-step encoding scheme where the header bits are estimated differently according to the macroblock modes is disclosed. In this way, the present invention allows precise rate control and increased picture quality. As will be explained, both rate and distortion models are used in the R-D optimized rate control algorithm according to different embodiments.

In the following description, the model-based rate control methods and systems for H.264 are based on a two-step encoding scheme. The high coding efficiency of H.264 is due mainly from the RDO having various intra and inter prediction modes. In a typical H.264 system, given a predetermined QP, the H.264 encoder chooses the best reference frame and the best MVs for each partition of the MBs as well as the best MB mode via RDO by minimizing the following formula:

$$J_{QP}(S_{QP})=D(S_{QP})+\lambda(QP) \cdot R(S_{QP}) \quad [1]$$

where $S_{QP}$ is a set of MVs, reference frames, and MB mode; and $\lambda(QP)$ are the Lagrange multipliers. There are two Lagrange multipliers for motion estimation and mode decision, respectively, and they are functions of the predetermined QP as follows:

$$\lambda_{MODE}(QP) = \begin{cases} 0.85 \times 2^{QP/3} & \text{for } I, P \text{ frame} \\ 4 \times 0.85 \times 2^{QP/3} & \text{for } B \text{ frame} \end{cases} \quad [2]$$

$$\lambda_{MOTION}(QP) = \sqrt{\lambda_{MODE}(QP)}$$

Due to the QP-dependent Lagrange multipliers, the RDO and rate control use the result from each other. The objective of rate control is to determine the QP so as to control the bit rate based on information such as the residual signal and the number of header bits. However, this information becomes available only after the RDO, which depends again on the QP since the RDO is performed using the QP-dependent Lagrange multipliers as shown in Equations 1 and 2.

To resolve the problems caused by the RDO-RC inter-dependency, two different QPs for the RDO and quantization are employed, respectively. Notations utilized throughout the following detailed description are as follows: $QP_1$ is an average QP of the previous frame and is used for the RDO of the current frame in a first encoding step, and $QP_2$ is used for the quantization of the residual signal in a second step of encoding and is determined by the R-D models. More specifically, for example, $QP_{2,j}$ is a QP value for the $j^{th}$ MB at the second step of encoding, $QP_n$ is an average QP value for the $n^{th}$ frame or the current frame, and $QP_{n-1}$ is an average QP value for the $(n-1)^{th}$ frame or the previous frame, which is the same to an average $QP_2$ value of the $(n-1)^{th}$ frame.

The two-step encoding scheme is based on the following observations. Firstly, the variation between the QPs of two successive frames is usually restricted to a small range to allow smooth quality changes, i.e., $$|QP_n - QP_{n-1}| \leq \Delta \text{ where } \Delta=3 \quad [3]$$

Secondly, while using different QP values for each of two encoding steps ($QP_1$ at the first step and $QP_2$ at the second step), the decrease of coding gain can be made negligible even though $QP_1$ and $QP_2$ are different by ensuring the difference between the two QP values is restricted to a small range, i.e., $$|QP_1 - QP_2| \leq \Delta \text{ where } \Delta=3 \quad [4]$$

The first observation that the variation between the QPs of two successive frames is restricted to a small range to allow smooth quality changes is a widespread technique utilized in the model-based frame-layer rate control methods. However, the second observation that the difference between the two QP values for the two steps of the encoding process must be minimized is unique to the present invention. The QP for the quantization step can have a different value from the QP for the RDO step. As long as the difference between the two QP values is sufficiently small, for example by ensuring the second quantization parameter $QP_2$ is within a predetermined range of the first quantization parameter $QP_1$, the impact on the coding gain is minimum.

Figure 2:
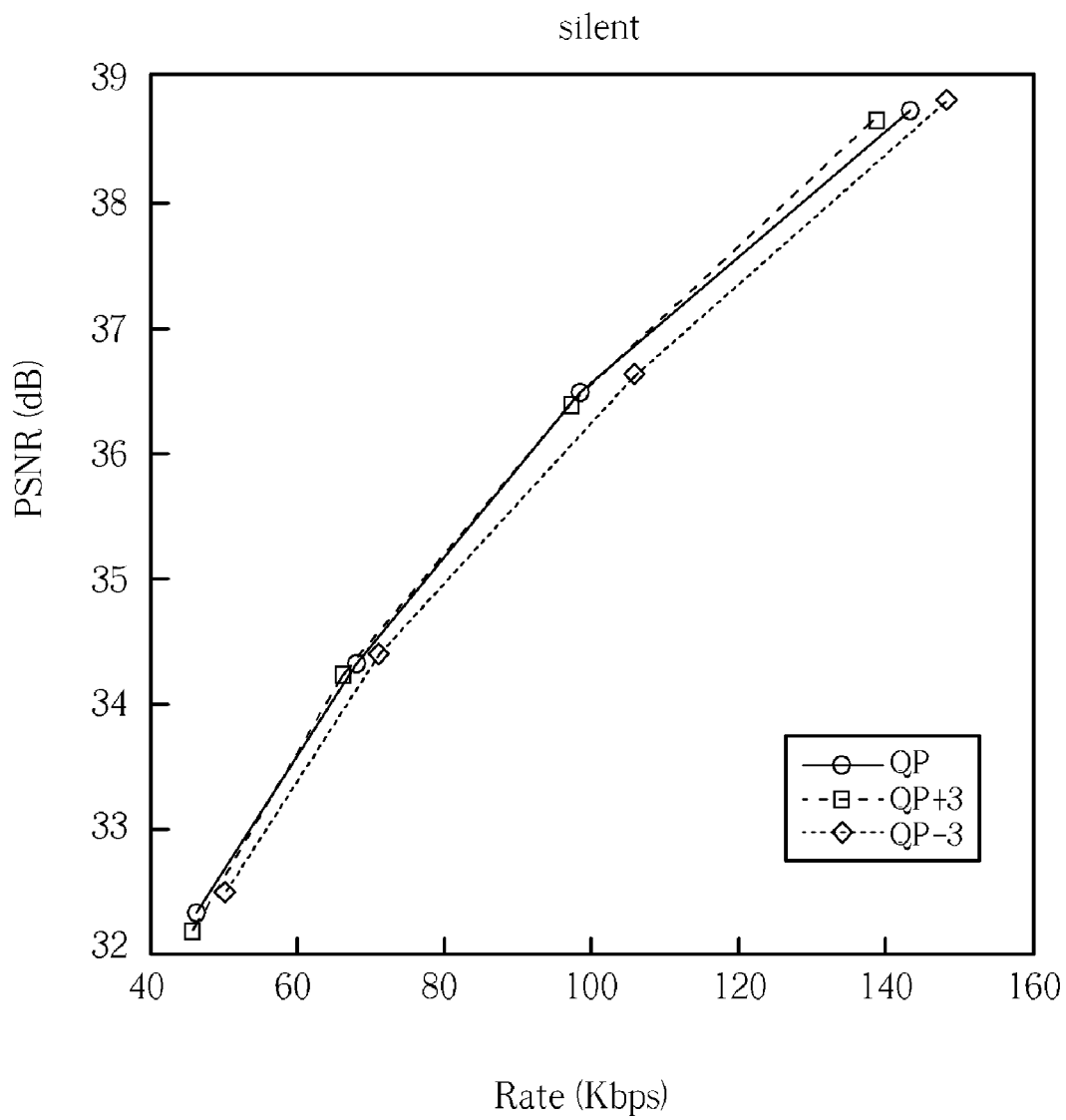
FIG. 2 is an R-D curve for the QCIF "silent" sequence with five reference frames having values of $QP_2$ differing from that of $QP_1$ by a value of 3.
Figure 3:
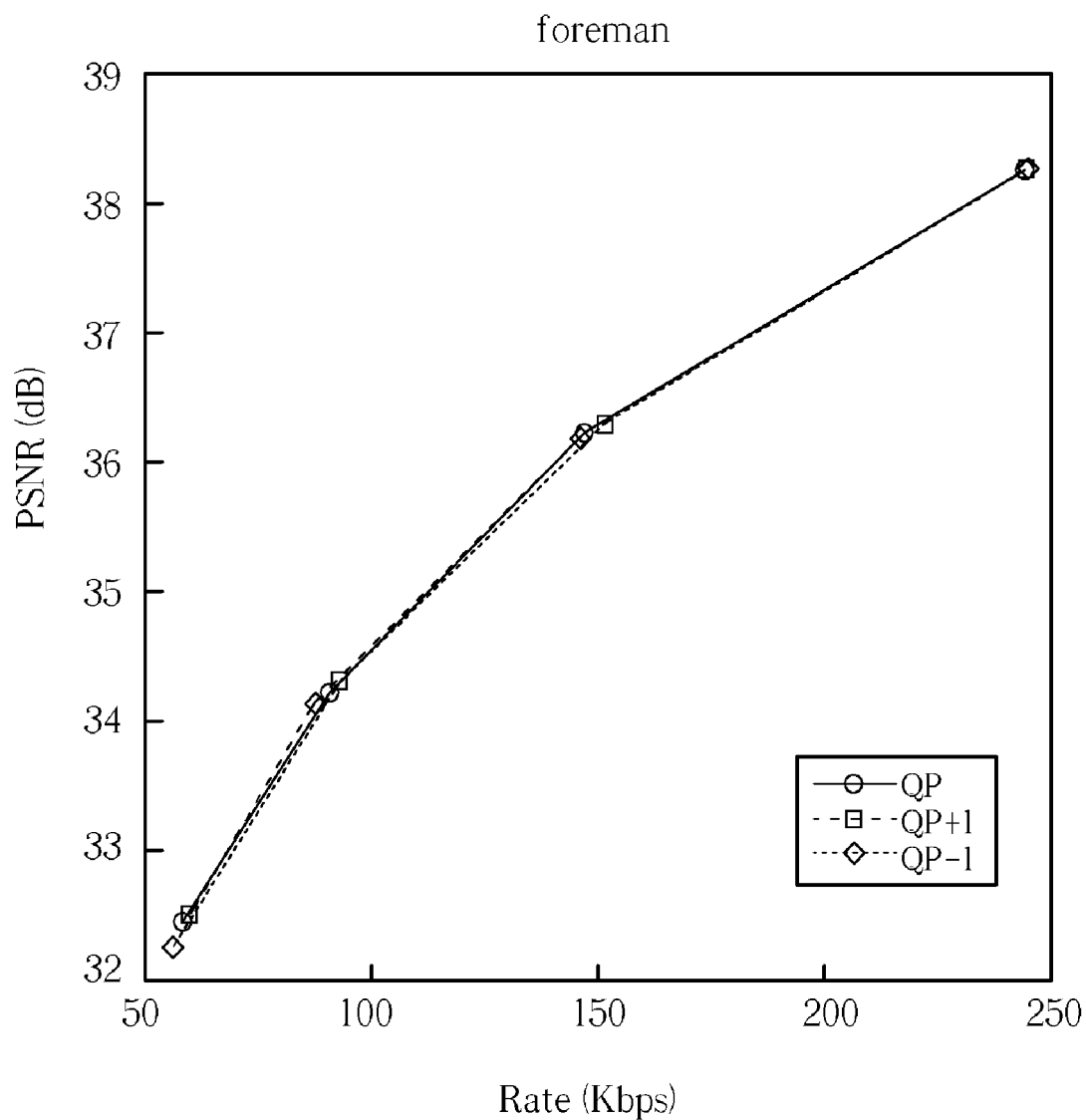
FIG. 3 is an R-D curve for the QCIF "foreman" sequence with five reference frames having values of $QP_2$ differing from that of $QP_1$ by a value of 1.
Figure 4:
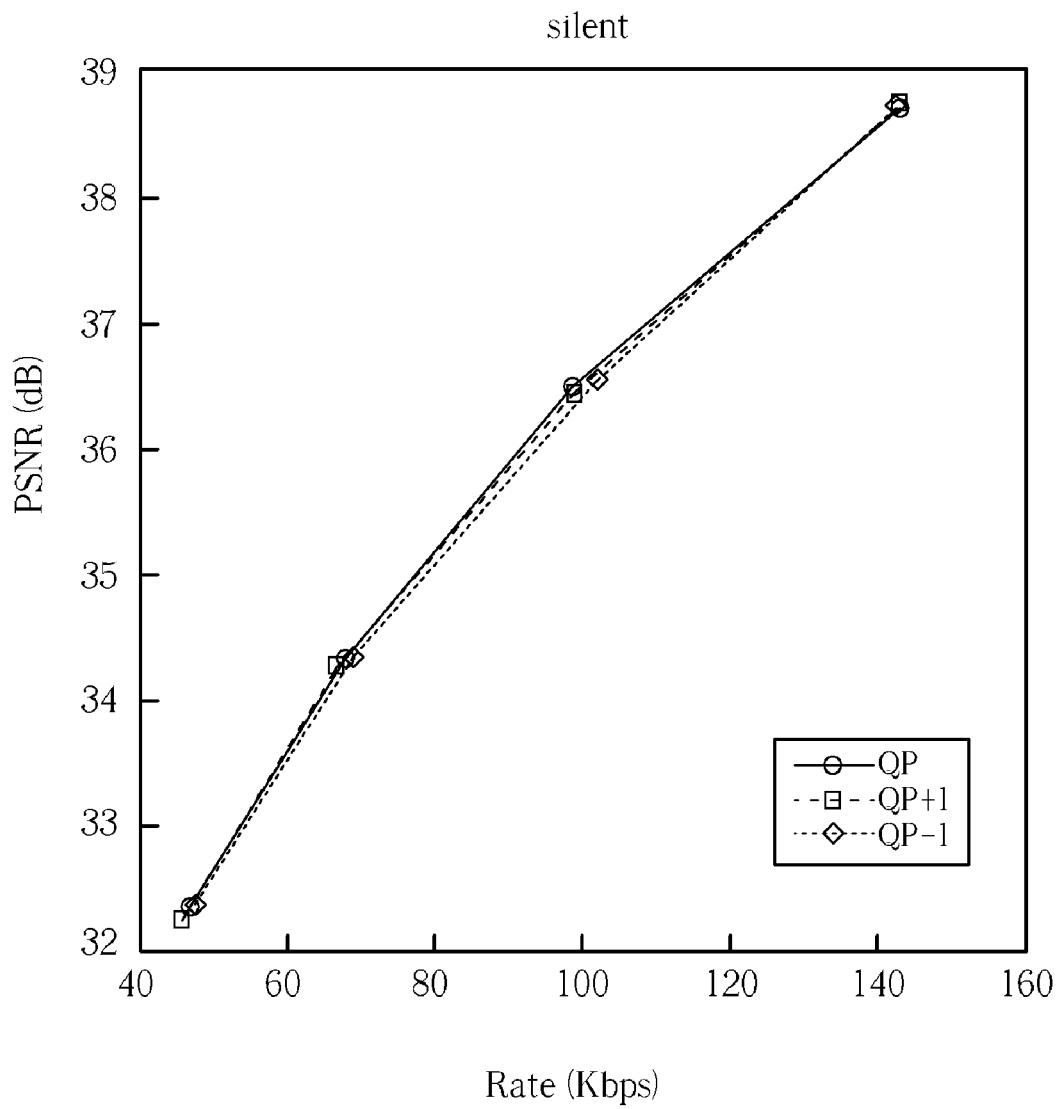
FIG. 4 is an R-D curve for the QCIF "silent" sequence with five reference frames having values of $QP_2$ differing from that of $QP_1$ by a value of 1.

FIG. 1 to FIG. 4 show R-D curves for two QCIF sequences ("foreman" and "silent") with five reference frames having values of $QP_2$ differing from that of $QP_1$ being used for quantization. Specifically, FIG. 1 and FIG. 2 illustrate the RDO being performed using $QP_1$=QP and the quantization being performed using $QP_2$=QP, QP+3, and QP−3. Similarly, FIG. 3 and FIG. 4 illustrate the RDO being performed using $QP_1$=QP and the quantization being performed using $QP_2$=QP, QP+1, and QP−1. As shown in FIG. 1 and FIG. 2, the decrease of coding gain is around 0.2 dB when the difference between the QP values $|QP_1-QP_2|$=3. As shown in FIG. 3 and FIG. 4, when the difference between the QP values $|QP_1-QP_2|$=1, the decrease of coding gain is negligible.

Figure 5:
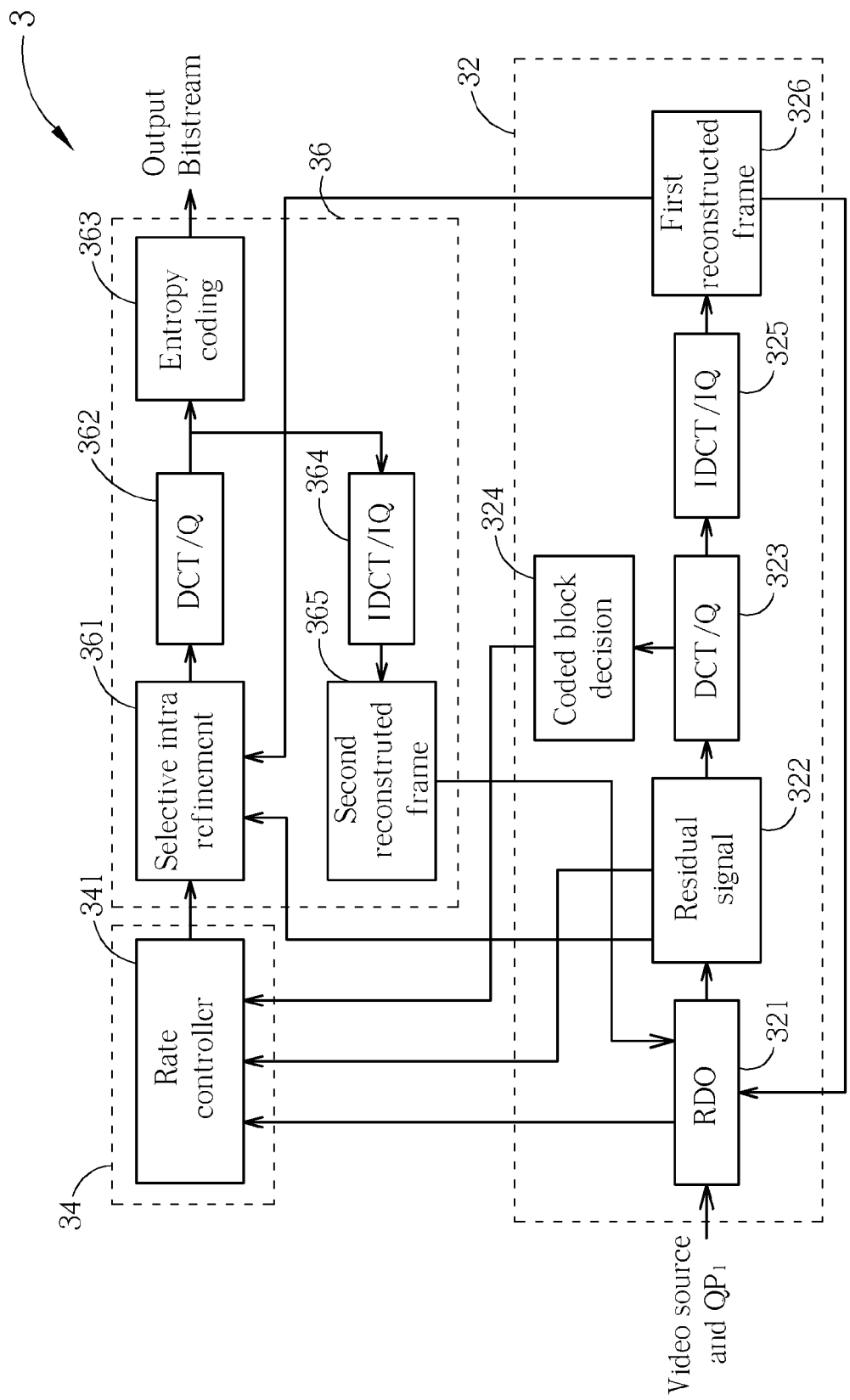
FIG. 5 shows a block diagram illustrating a video encoding system according to an exemplary embodiment of the present invention.

FIG. 5 shows a block diagram illustrating a video encoding system 3 according to an exemplary embodiment of the present invention. The video encoding system 3 comprises a first-step encoding device 32, a rate control device 34, and a second-step encoding device 36. The first-step encoding device 32 is similar to a general video encoder except that an entropy coding unit is excluded therein. The first-step encoding device 32 comprises an RDO unit 321, a residual signal storage unit 322, a DCT and quantization unit 323, a coded block decision unit 324, an inverse DCT and inverse quantization (IQ) unit 325, and a first reconstructed frame storage 326. In the RDO unit 321, the R-D optimized motion estimation and mode decision is performed using the first quantization parameter $QP_1$ for all MBs of the frame. The residual signal and the header information such as MVs and reference frames obtained from the RDO unit 321 are stored in the residual signal unit 322. The MBs can be predicted from the reconstructed pixels of the previous MBs when employing the intra prediction mode. Each MB is reconstructed for intra prediction of the next MBs via the DCT and quantization unit 323 and the inverse DCT and inverse quantization unit 325. The reconstructed frame is then stored in the first reconstructed frame storage 326. For the rate controller unit 341 in the rate control device 34, the coded 4×4 blocks are identified as the QP values from $QP_1-\Delta$ to $QP_1+\Delta$ in the coded block decision unit 324 while performing the DCT.

The rate control device 34 determines the second quantization parameter $QP_2$ for the second step of the encoding process. The rate controller unit 341 requires input date including header information such as MVs and reference frames, the residual signals, and the information of the coded 4×4 blocks from the first-step encoding device 32. The second-step encoding device 36 generates the output bit-stream using the second quantization parameter $QP_2$ determined by the rate control device 34. The second-step encoding device 36 comprises a selective intra refinement unit 361, a DCT and quantization (Q) unit 362, an entropy coding unit 363, an inverse quantization (IQ) and inverse DCT (IDCT) unit 364, and a second reconstructed frame storage 365. The selective intra refinement unit 361 is activated only when a MB mode in the first step of encoding is set to intra prediction mode. Since the quantization and inverse quantization are performed using the first and second quantization parameters $QP_1$, $QP_2$ in the first and second step of encoding, respectively, the reconstructed previous MBs in the second-step encoding device 36 may be different from those in the first-step encoding device 32. Therefore, when the MB is of intra mode, its residual signal is refined using the intra mode determined in the first-step encoding device 32. The output bit-stream is generated via the entropy coding unit 363 and the DCT and quantization unit 362, where the quantization is performed using $QP_2$. Finally, the frame is reconstructed again via the inverse DCT and inverse quantization unit 364 and is stored in the second reconstructed frame storage 365. Note that the second reconstructed frame is used for intra predictions of the subsequent MBs in the current frame and for inter predictions of the subsequent frames.

Figure 6:
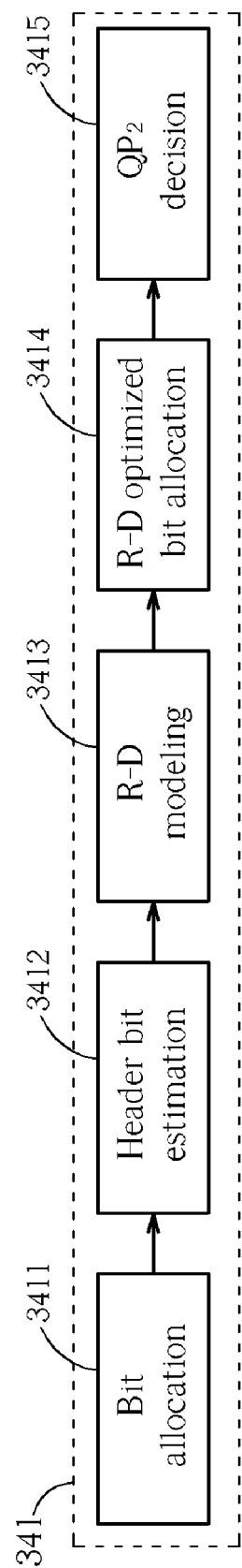
FIG. 6 illustrates a block diagram of the rate controller unit of FIG. 5.

FIG. 6 illustrates a block diagram of the rate controller unit 341 according to an exemplary embodiment of the present invention. The rate controller unit 341 comprises a bit allocation unit 3411, a header bit estimation unit 3412, an R-D modeling unit 3413, an R-D optimized bit allocation unit 3414, and a $QP_2$ decision unit 3415. In the bit allocation unit 3411, an adequate number of bits are allocated to the frame according to parameters such as the available channel bandwidth, buffer status, etc. The header bit estimation unit 3412 estimates the required number of header bits for all MBs after the first step of encoding. The number of header bits should be estimated to get the available number of texture bits given the total allocated number of bits to the frame. In some embodiments, the number of header bits is estimated using motion vector MV information according to a header rate model. The R-D modeling unit 3413 estimates rate and distortion values for the QPs from $QP_1-\Delta$ to $QP_1+\Delta$. According to some embodiments of the present invention, the invented texture rate model and distortion model are utilized to estimate rate and distortion values, respectively. The R-D modeling unit 3413 also updates the model parameters after the second encoding step. The R-D optimized bit allocation unit 3414 allocates the adequate number of bits to each class of MBs in the R-D sense when R-D optimized bit allocation is employed. The $QP_2$ decision unit 3415 determines the second quantization parameter $QP_2$ for the second encoding step based on the rate and distortion values estimated by the R-D modeling unit 3413 and the available number of texture bits.

The performance of model-based rate control depends on the employed R-D models. In this embodiment, two rate models and one distortion model are employed and are described in the following explanations. In H.264, the number of header bits takes up a large portion of the total number of bits due to the availability of employing various MB modes and multiple reference frames. As previously mentioned, the header bits also vary greatly between different MBs and between different frames. In other words, the control of header rate is equally as important as the control of texture rate. For this reason, both the header rate model and the texture rate model are employed within this embodiment. Assuming that all MBs in a frame are encoded using the same QP, there are four types of bits: the MV bits, the MB mode bits, the coded block pattern (CBP) bits, and the residual bits. The MV bits and the MB mode bits are classified as header bits while the CBP bits and the residual bits are classified as texture bits. Note that the CBP bits have a strong relationship with the residual bits even though the CBP is technically part of the header information. For example, if there is no residual signal to encode, both the number of residual bits and the number of the CBP bits are zero. Therefore, the header rate model in this embodiment only estimates the number of MV bits and the number of MB mode bits. The MV information includes the MV itself and the reference frame, thus the number of bits for all of MVs, reference frames, and MB modes can be estimated. In this embodiment of the header rate model, each MB is classified into one of two modes: inter and intra MBs. The number of header bits for the two modes are then estimated separately. For inter MBs, some embodiments of the present invention observes that the number of header bits has a linear relationship to the number of non-zero MB elements and the number of MVs. The number of header bits for inter-coded blocks can be estimated according to a linear relationship between a number of non-zero block elements, $N_{nzMVe}$ and a number of motion vectors, $N_{MV}$ in the current frame. To give an example, suppose a MB is partitioned into four 8×8 blocks and four MVs are (4, 1), (2, 0), (3, 7) and (0, 0). Then $N_{nzMVe}$ is 5 (4, 1, 2, 3 and 7) and $N_{MV}$ is 4. The number of header bits for the inter MBs in the frame, $R_{hdr,inter}$ can be estimated by the following formula:

$$R_{hdr,inter} = \gamma_1 \cdot N_{nzMVe} + \gamma_2 \cdot N_{MV} \quad [5]$$

where $\gamma_1$ and $\gamma_2$ are model parameters. Equation 5 is capable of estimating the number of header bits for the inter MBs fairly accurate with two model parameters. However, in some other embodiments, it is also possible to utilize the following linear model with a single parameter instead of Equation 5 at the cost of little additional estimation error.

$$R_{hdr,inter} = \gamma \cdot (N_{nzMVe} + w \cdot N_{MV}) \quad [6]$$

where $\gamma$ is a model parameter and w is a fixed coefficient having different values according to the number of reference frames being used as shown in Equation 7.

$$w = \begin{cases} 0.5 & \text{if \# of reference frame} \geq 5 \\ 0.4 & \text{if \# of reference frame} \geq 3 \\ 0.3 & \text{otherwise} \end{cases} \quad [7]$$

Figure 7:
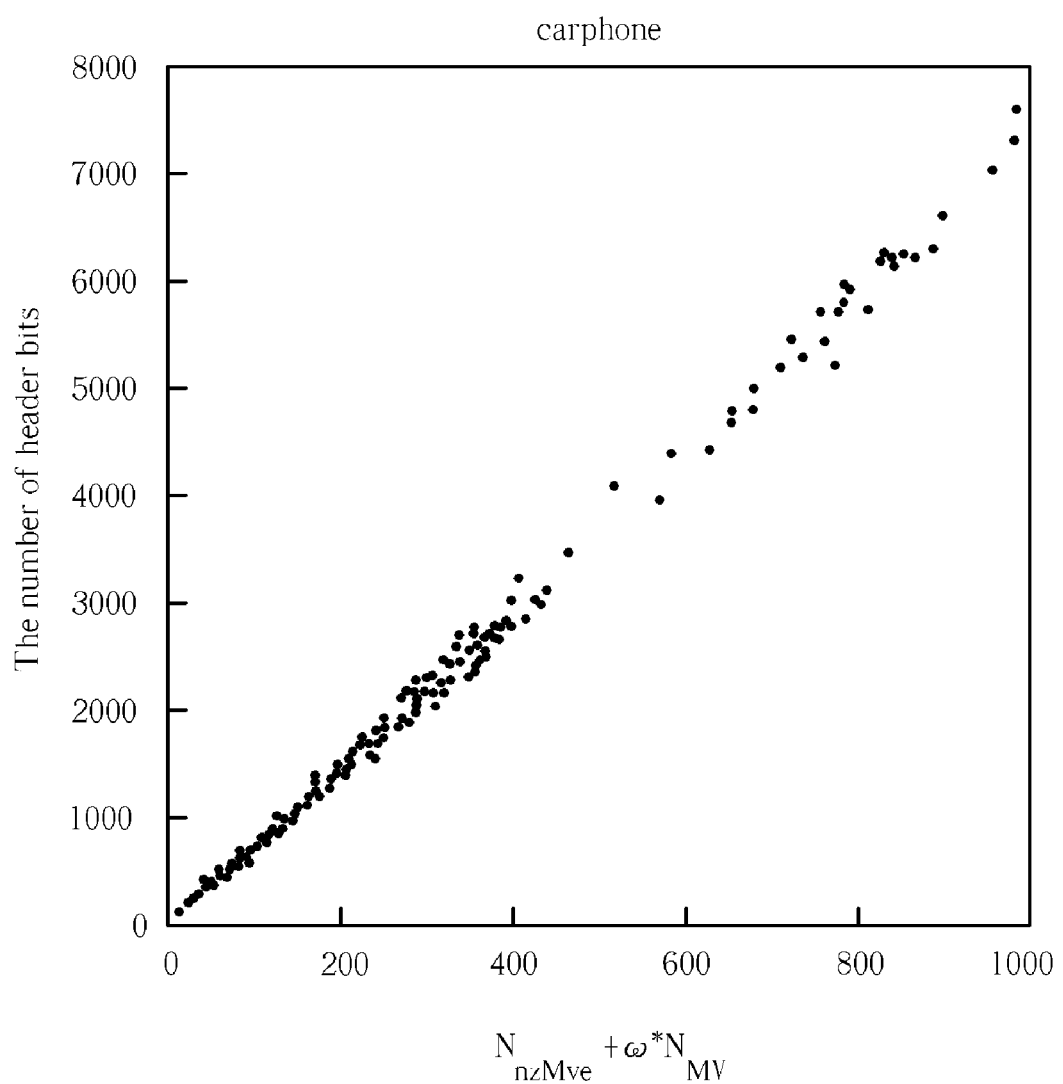
FIG. 7 shows a linear relationship between $N_{nzMVe}+w \cdot N_{MV}$ and the number of header bits of inter MBs for the QCIF "carphone" sequence.
Figure 8:
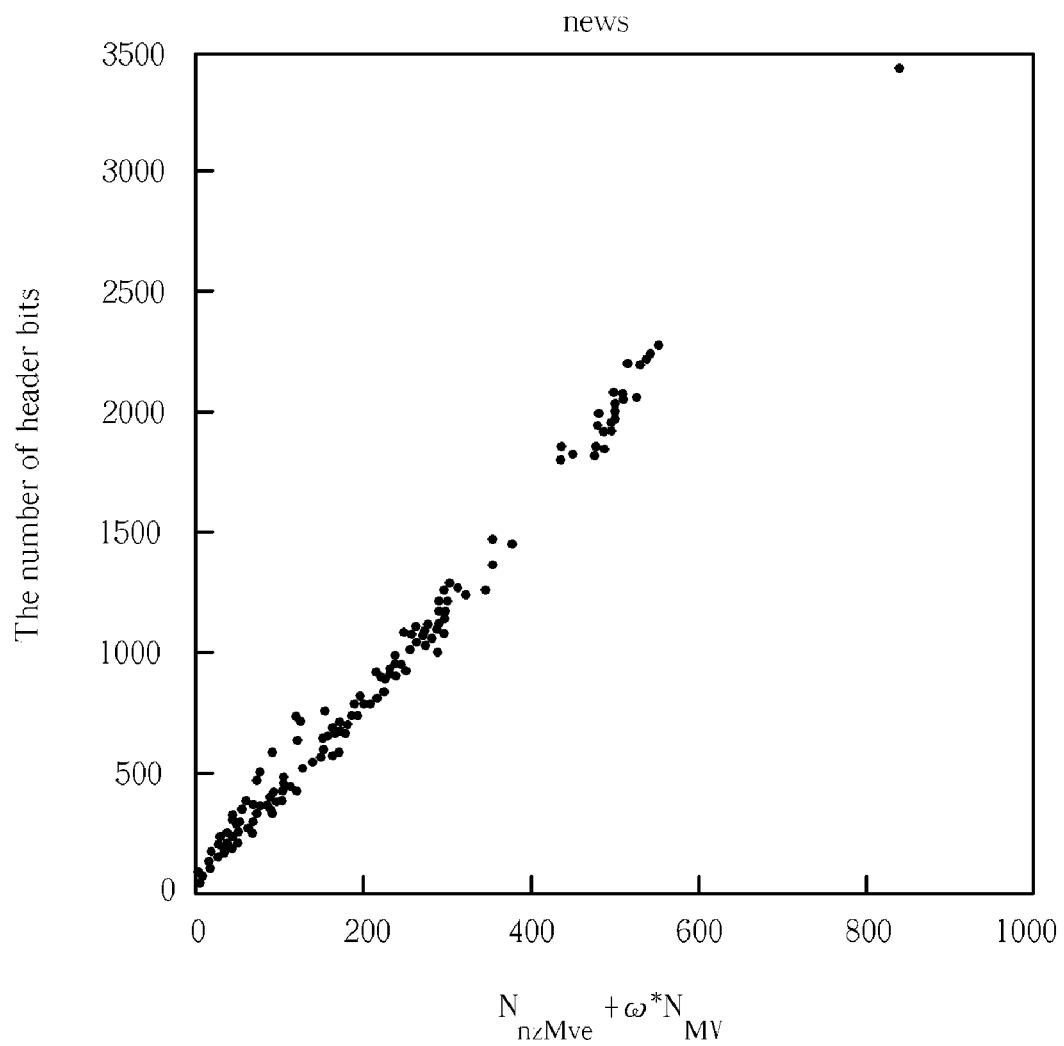
FIG. 8 shows a linear relationship between $N_{nzMVe}+w \cdot N_{MV}$ and the number of header bits of inter MBs for the QCIF "news" sequence.

In support of the above equations, FIG. 7 and FIG. 8 show a linear relationship between $N_{nzMVe} + w \cdot N_{MV}$ and the number of header bits for inter MBs. In FIG. 7 and FIG. 8, the first 30 frames are encoded using every five QP values between 15 and 45 with three reference frames.

In this embodiment, the number of header bits for intra MBs, $R_{hdr,intra}$ is simply estimated by averaging those of the previous frames. The total number of header bits is sum of the estimated header bits for inter MBs and intra MBs. For example, let $N_{intra}$ be the number of intra MBs and let $b_{intra}$ be the average number of header bits per intra MB. Then, the number of header bits of the frame, $R_{hdr}$ is the sum of those of intra MBs and intra MBs as follows:

$$R_{hdr} = R_{hdr,inter} + R_{hdr,intra} = R_{hdr,inter} + N_{intra} \cdot b_{intra} \quad [8]$$

Figure 9:
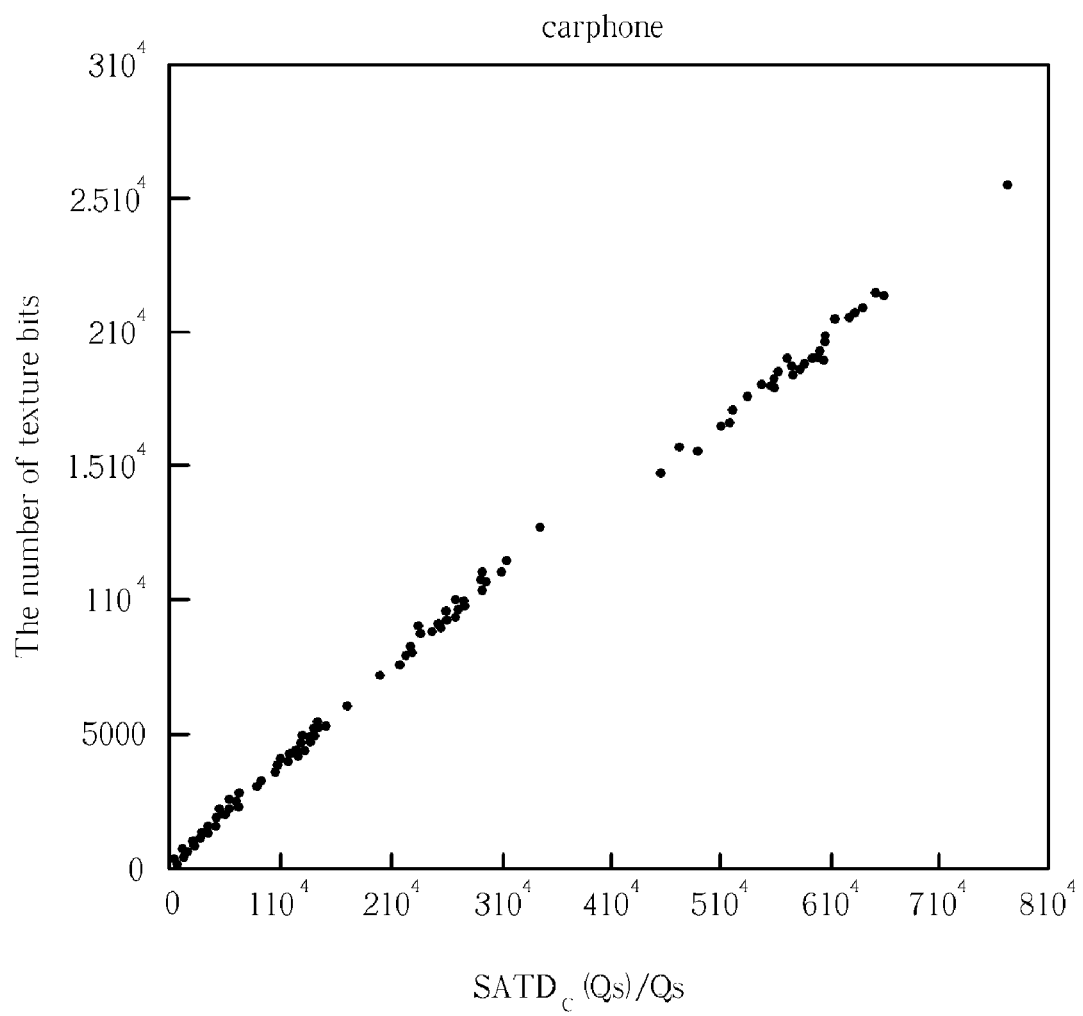
FIG. 9 shows a linear relationship between $SATD_C(Qs)/Qs$ and the number of texture bits for the QCIF "carphone" sequence.
Figure 10:
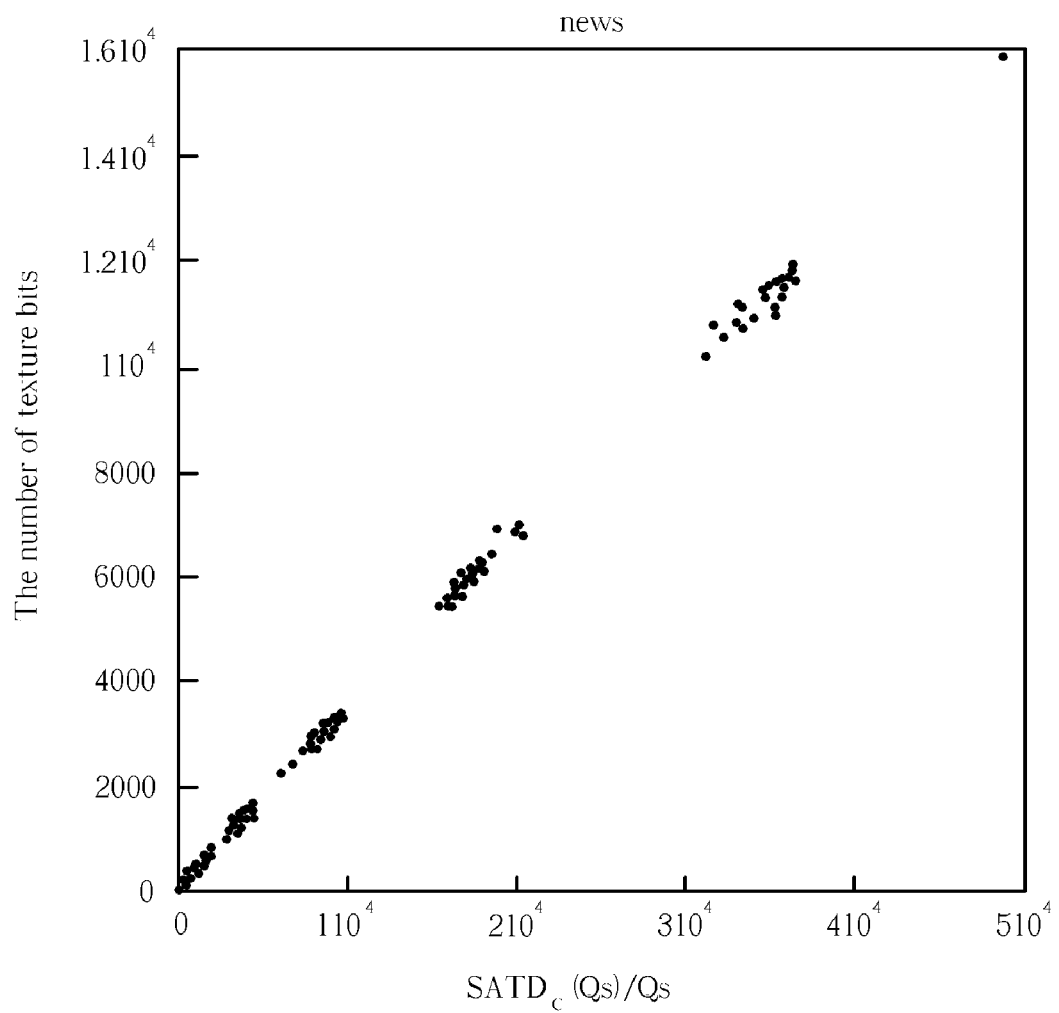
FIG. 10 shows a linear relationship between $SATD_C(Qs)/Qs$ and the number of texture bits for the QCIF "news" sequence.

Concerning the texture rate model, the number of residual bits and the number of CBP bits are estimated. In H.264, the basic unit for the DCT and the quantization is a 4×4 block. Accordingly, the smallest unit that can be coded or skipped is a 4×4 block. If all of the 4×4 DCT coefficients are zero after quantization, the block is skipped; otherwise, it is coded. In this embodiment, the 4×4 blocks are classified into two types being the coded blocks and the skipped blocks. Since no bits are required for encoding the skipped 4×4 blocks, the number of texture bits is estimated only based on the coded 4×4 blocks. For example, let $SATD_C(Qs)$ be the sum of absolute transform different (SATD) of the coded 4×4 blocks in the frame, where Qs is the quantizer step-size corresponding to the QP. The number of texture bits $R_{txt}$ can be modeled based on a quadratic rate model as shown in Equation 9:

$$R_{txt}(Qs) = \alpha_1 \cdot \frac{SATD_C(Qs)}{Qs} + \alpha_2 \cdot \frac{SATD_C(Qs)}{Qs^2} \quad [9]$$

where $\alpha_1$ and $\alpha_2$ are the model parameters. It is noted that using the MAD of the coded 4×4 blocks instead of SATD, that is replacing $SATD_C(Qs)$ by $MAD_C(Qs)$ in Equation 9 will result in approximately the same value. However, in this embodiment, $SATD_C(Qs)$ is employed for its slightly better performance. Assuming $SATD_C(Qs)$ and $MAD_C(Qs)$ are the same, the difference between Equation 9 and the original quadratic rate model is that Equation 9 considers only the complexities of the coded 4×4 blocks. The reason for this simplification is that experimental results have shown that estimation errors is significantly reduced by considering only the complexities of the coded 4×4 blocks. Experimental results also show that the number of texture bits can be estimated very accurately by a linear function at widely used bit rates in practical video encoders as shown in Equation 10:

$$R_{txt}(Qs) = \alpha \cdot \frac{SATD_C(Qs)}{Qs} \quad [10]$$

where $\alpha$ is a model parameter. In support of the above equations, FIG. 9 and FIG. 10 show linear relationships between $SATD_C(Qs)/Qs$ and the number of texture bits for different frames, for which the first 30 frames are encoding using ever five QP values between 15 and 45 with three reference frames. As shown, the linear relationship clearly exists between the two variables $SATD_C(Qs)/Qs$ and the numbers of texture bits.

In order to properly implement the rate model according to this embodiment, each 4×4 block within a MB should be classified as either a coded block or a skipped block based on the value of Qs, thus based on the corresponding QP. In H.264, the integer DCT and fast quantization method are employed to avoid both multiplication and division in the DCT and to avoid division in the quantization. For example, let X(i, j) and $X_q$(i, j) be the 4×4 DCT coefficient at position (i, j) before and after the quantization, respectively. The coefficient X(i, j) is quantized by the following formula [11]:

$$X_q(i,j) = \text{sign}\{X(i,j)\} \cdot [(|X(i,j)| \cdot A(Q_M,i,j) + f \cdot 2^{17+Q_E}) >> (17+Q_E)] \quad [11]$$

where $Q_M \equiv QP \bmod 6$ and $Q_E \equiv QP/6$. The $A(Q_M, i, j)$ is the integer value in the quantization table and f controls the quantization width near the origin. As shown in Equation 11, the quantized value $X_q(i, j)$ depends on the QP, which makes it difficult to determine whether a block is coded or not. Since the maximum difference allowed between $QP_1$ and $QP_2$ is set to $\Delta$ according to some embodiments, it is only needed to check if the 4×4 block is coded within the QP values from $QP_1-\Delta$ to $QP_1+\Delta$. The 4×4 block identification procedure is performed in the coded block decision unit 324 of FIG. 5 during the DCT and quantization in the first step of encoding. In order to identify the coded blocks for the QP values from $QP_1-\Delta$, to $QP_1+\Delta$, the maximum DCT coefficients are quantized using the QP values from $QP_1-\Delta$ to $QP_1+\Delta$. For example, let $X_{max}(i, j)$ be the DCT coefficient that has the maximum value of $|X(i, j)| \cdot A(Q_M, i, j)$ out of 16 coefficients in a 4×4 block with $QP=QP_1$. Even though the quantization matrix $A(Q_M)$ has different entries depending on the QP, their relative values are almost the same regardless of the QP. For this reason, the DCT coefficient that has the maximum value of $|X(i, j)| \cdot A(Q_M, i, j)$ with $QP=QP_1$ is likely to have the maximum value of $|X(i, j)| \cdot A(Q_M, i, j)$ with QP values other than $QP_1$. Thus, by quantizing only $X_{max}(i, j)$ using the QP values from $QP_1-\Delta$ to $QP_1+\Delta$, it is possible to identify if the 4×4 block will be coded or not with the QP values from $QP_1-\Delta$ to $QP_1+\Delta$.

In some embodiments of the present invention, the distortion is modeled only for coded 4×4 blocks. For example, let $D_C$ and $D_S$ be the distortion values of the coded and skipped 4×4 blocks, respectively. In this case, the total distortion value D is the sum of $D_C$ and $D_S$ as shown in Equation 12:

$$D = D_C + D_S \quad [12]$$

The distortion of skipped 4×4 blocks can be determined directly from the residual signal. Therefore, only the distortion of coded 4×4 blocks needs to be estimated. Similar to the rate model, the distortion value of the coded 4×4 blocks $D_C$ can be modeled utilizing the following quadratic model:

$$D_C(Qs) = \beta_1 \cdot SATD_C(Qs) \cdot Qs + \beta_2 SATD_C(Qs) \cdot Qs^2, \quad [13]$$

where $\beta_1$ and $\beta_2$ are model parameters. Also similar to the above described rate model, $D_C$ can be estimated by a linear model with only a small increase in the estimation error as follows:

$$D_C(Qs) = \beta \cdot SATD_C(Qs) \cdot Qs, \quad [14]$$

where $\beta$ is a model parameter. It has been shown in the related art that the distortion values can be modeled by exponential models. However, according to this embodiment, the distortion can be modeled more accurately by the linear distortion model of Equation 14 after identifying the coded 4×4 blocks.

Figure 11:
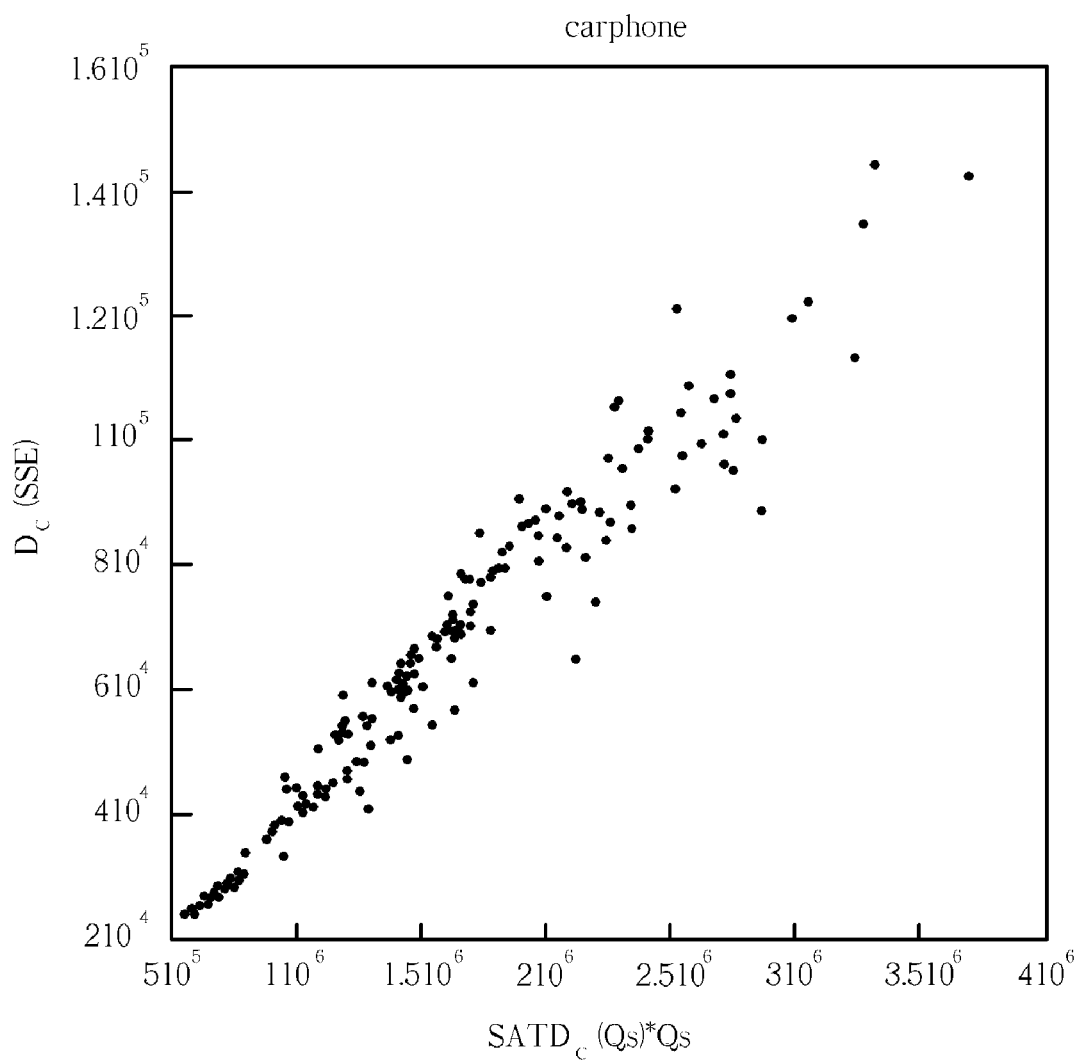
FIG. 11 shows a linear relationship between $SATD_C(Qs)/Qs$ and the distortion of the coded 4×4 blocks in terms of the sum of square error (SSE) for the QCIF "carphone" sequence.
Figure 12:
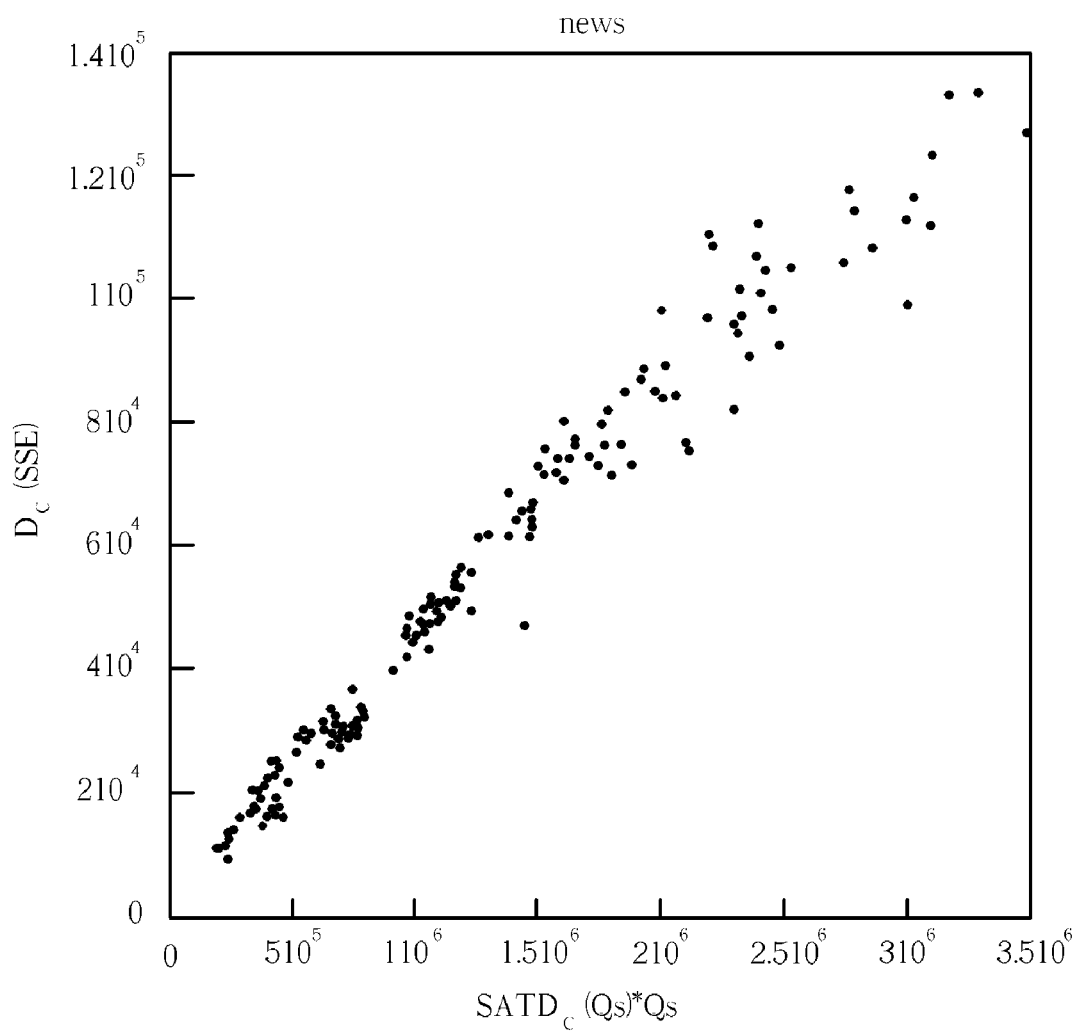
FIG. 12 shows a linear relationship between $SATD_C(Qs)/Qs$ and the distortion of the coded 4×4 blocks in terms of the sum of square error (SSE) for the QCIF "news" sequence.
Figure 13:
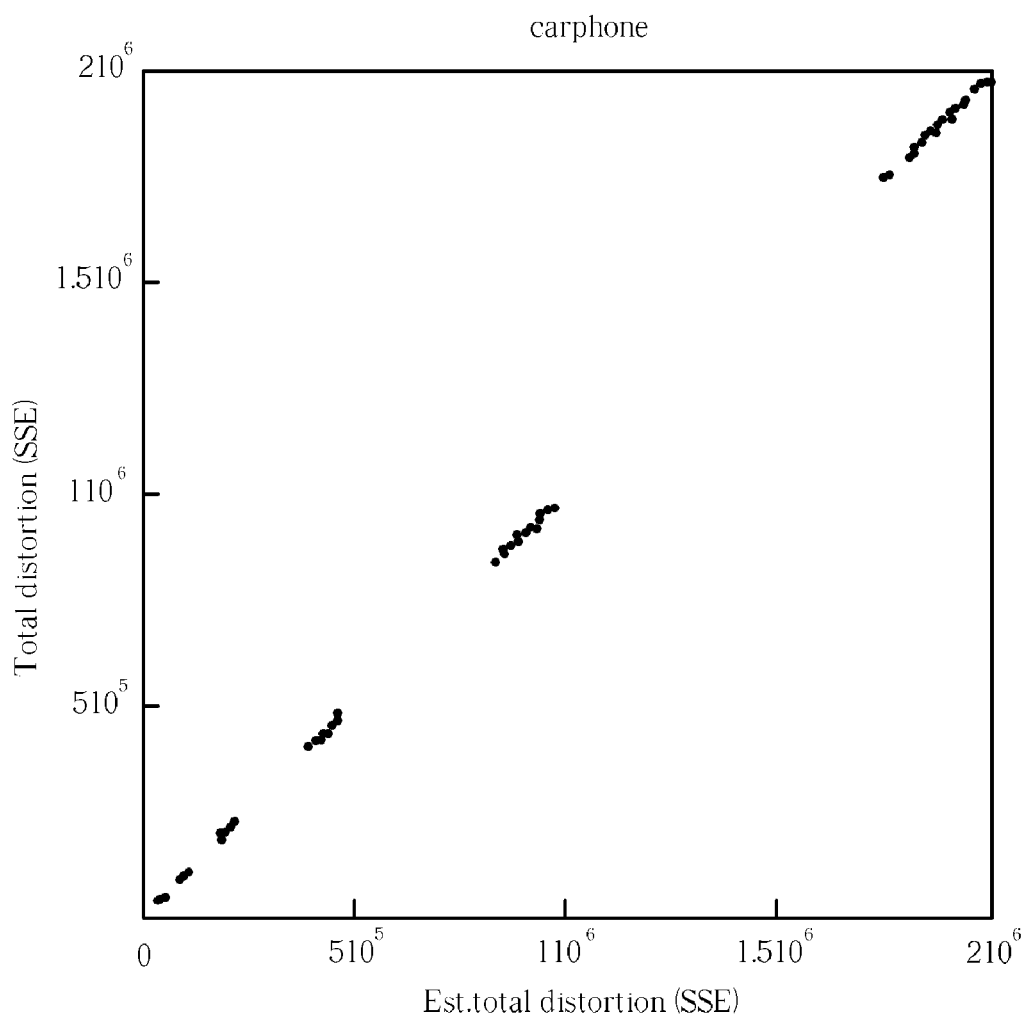
FIG. 13 shows the relationship between the total distortion and the estimated total distortion being the sum of the distortion of the skipped blocks and the estimated distortion of the coded blocks according to Equation 14 in the detailed description for the QCIF "carphone" sequence.
Figure 14:
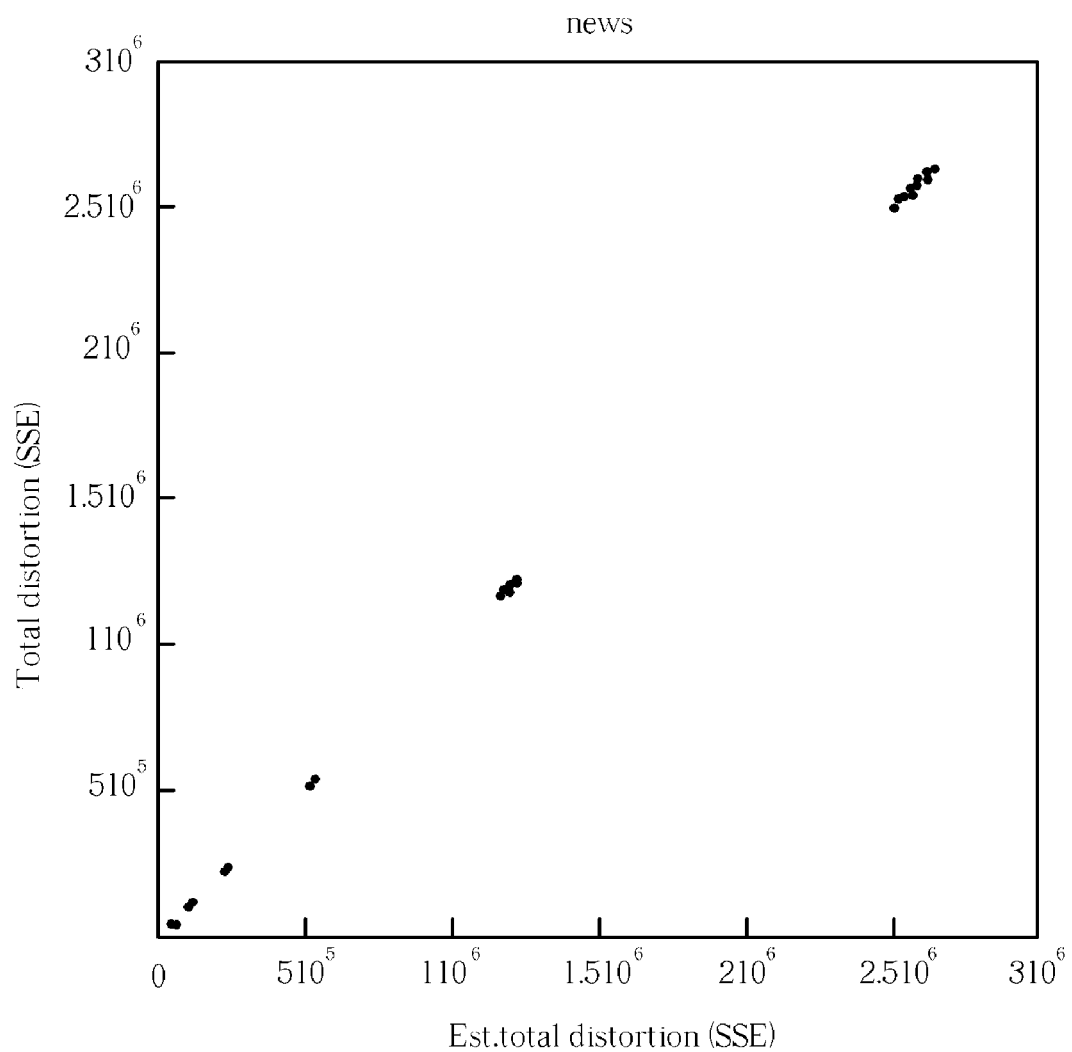
FIG. 14 shows the relationship between the total distortion and the estimated total distortion being the sum of the distortion of the skipped blocks and the estimated distortion of the coded blocks according to Equation 14 in the detailed description for the QCIF "news" sequence.

In support of the above equations, FIG. 11 and FIG. 12 show linear relationships between $SATD_C(Qs)/Qs$ and the distortion value of the coded 4×4 blocks in terms of the sum of square error (SSE). In the examples shown in FIG. 11 and FIG. 12, the first 30 frames are encoded using every five QP values between 15 and 45 with three reference frames. Although the results shown in FIG. 11 and FIG. 12 are not strictly linear, the relationship between the total distortion and the estimated total distortion is indeed linear. FIG. 13 and FIG. 14 show the relationship between the total distortion and the estimated total distortion, which is the sum of the distortion of the skipped blocks and the estimated distortion of the coded blocks according to Equation 14. From FIG. 13 and FIG. 14, it is shown that the linear distortion model according to this embodiment estimates the total distortion very accurately.

Figure 15:
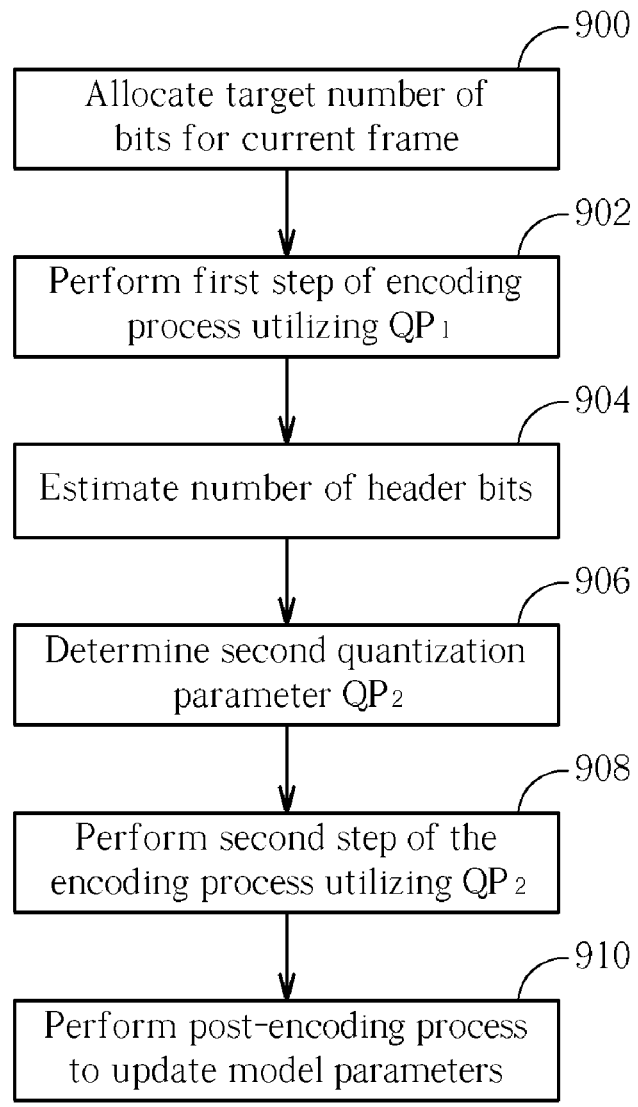
FIG. 15 illustrates a flowchart of a frame-layer rate control method based on a two-step encoding scheme according to a first exemplary embodiment of the present invention.

FIG. 15 illustrates a flowchart of a frame-layer rate control method based on a two-step encoding scheme according to an exemplary embodiment of the present invention. Provided that substantially the same result is achieved, the steps of the flowchart shown in FIG. 15 need not be in the exact order shown and need not be contiguous, that is, other steps can be intermediate. In this embodiment, the frame-layer rate control method includes the following steps:

Step 900: Allocate a target number of bits for current frame.

Step 902: Perform the first step of the encoding process utilizing the first quantization parameter $QP_1$.

Step 904: Estimate the number of header bits.

Step 906: Determine the second quantization parameter $QP_2$.

Step 908: Perform the second step of the encoding process utilizing the second quantization parameter $QP_2$.

Step 910: Perform post-encoding process to update model parameters.

At step 900, the target number of bits for the current frame $R_T$ is allocated. The target number of bits is determined according to various factors such as channel bandwidth, buffer status, picture qualities, etc. The bit allocation method is not a focus of the present invention and any of the well-known bit allocation methods could be utilized to perform step 900. At step 902, the first step of the encoding process is performed using the first quantization parameter $QP_1$, which is the average QP of the previous frame. The first step of the encoding process includes performing the RDO for all MBs of the current frame, and then during the operation of the DCT and quantization, identifying the coded 4×4 blocks of all MBs and calculating the corresponding $SATD_C(Qs)$. At step 904, the number of header bits of the frame is estimated using Equation 8 such that the available number of texture bits can be obtained according to Equation 15:

$$R_{txt} = R_T - R_{hdr}. \quad [15]$$

In different embodiments, the number of header bits of the inter MBs can be estimated by either Equation 5 or Equation 6.

At step 906, the second quantization parameter $QP_2$ of the current frame is determined. First, the number of texture bits $R_{txt}(Qs)$ of the current frame is estimated using the $SATD_C(Qs)$ of the current frame by either Equation 9 or Equation 10 for all QP values ranging from $QP_1-\Delta$ to $QP_1+\Delta$. The SATD of the coded 4×4 blocks of the frame is the sum of the SATD of the coded 4×4 blocks for all MBs in the frame as shown in Equation 16:

$$SATD_C(Qs) = \sum_{j=1}^{N_{MB}} SATD_C(Qs, j) \quad [16]$$

where $N_{MB}$ is the total number of MBs of the frame and $SATD_C(Qs, j)$ is the SATD of the coded 4×4 blocks in the $j^{th}$ MB. Finally, the $QP_2$ that gives a minimum distance between $R_{txt}$ and $R_{txt}(Qs)$ is identified, i.e., $$QP_2 = \operatorname*{argmin}_{q \in (QP_1-\Delta, QP_1+\Delta)} |R_{txt}(Qs(q)) - R_{txt}| \quad [17]$$

where $Qs(q)$ is the quantizer step-size corresponding to the quantization parameter q.

At step 908, the residual signals of all MBs from the first step of encoding (step 902) are encoded using the second quantization parameter $QP_2$. When the MB is intra coded in the first step of encoding (step 902), the residual signal is refined using the same intra mode determined in the first step of encoding (step 902). At step 910, the model parameters are updated using the least square approximation (LSA), and the buffer status is also updated. It should be noted that, in an exemplary embodiment, the value $\Delta$ is set to 3 to ensure minimal coding gain loss.

Figure 16:
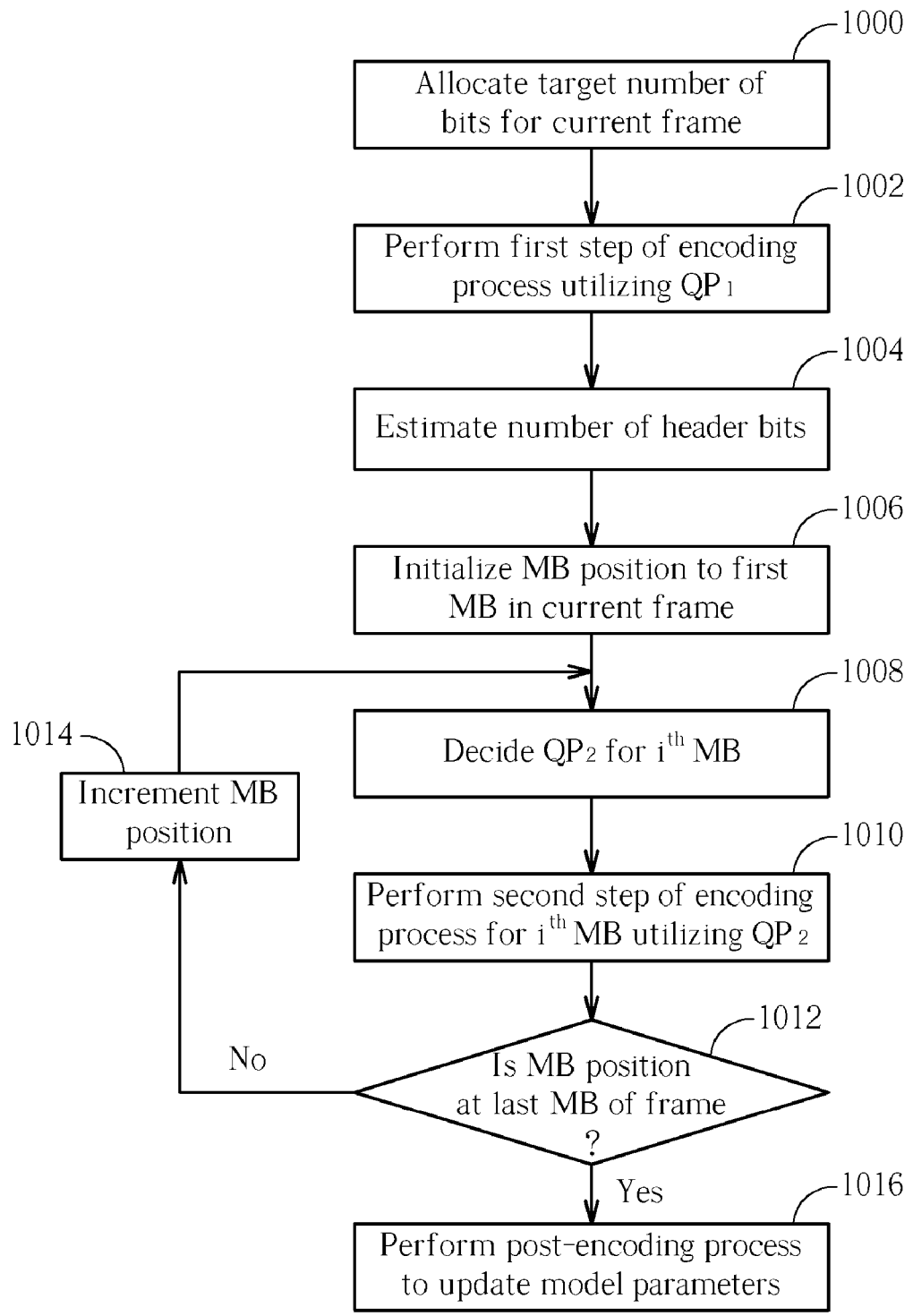
FIG. 16 illustrates a flowchart of a MB-layer rate control method based on a two-step encoding scheme according to a second exemplary embodiment of the present invention.

FIG. 16 illustrates a flowchart of a MB-layer rate control method based on a two-step encoding scheme according to another exemplary embodiment of the present invention. Provided that substantially the same result is achieved, the steps of the flowchart shown in FIG. 15 need not be in the exact order shown and need not be contiguous, that is, other steps can be intermediate. In this embodiment, the MB-layer rate control method includes the following steps:

Step 1000: Allocate a target number of bits for current frame.

Step 1002: Perform the first step of the encoding process utilizing the first quantization parameter $QP_1$.

Step 1004: Estimate the number of header bits.

Step 1006: Initialize a MB position to the first MB in the current frame.

Step 1008: Decide a second quantization parameter $QP_2$ for the $i^{th}$ MB.

Step 1010: Perform the second step of the encoding process for the $i^{th}$ MB utilizing the second quantization parameter $QP_2$.

Step 1012: Is the MB position the last MB of the frame? If yes, proceed to step 1016; otherwise, proceed to step 1014.

Step 1014: Increment the MB position to the next MB in the current frame.

Step 1016: Perform post-encoding process to update model parameters.

Comparing this embodiment with the previous frame-layer rate control method shown in FIG. 15, the major difference are the steps from 1006 to 1014. At step 1006, the MB position is set to the first MB of the current frame. At step 1008, the second quantization parameter $QP_2$ for the $i^{th}$ MB is determined, and the $i^{th}$ MB is encoded again using the $QP_2$ at the step 1010. Step 1012 checks if the $i^{th}$ MB is the last MB of the frame, and if it is not the last MB, the processing is continued with the next MB at step 1014. At step 1008, the number of texture bits required for encoding the remaining MBs, i.e., from the $i^{th}$ to the $N_{MB}^{th}$ MB, is estimated by either Equation 9 or Equation 10 using the SATD of the coded 4×4 blocks of the remaining MBs for the different QP values from $QP_1-\Delta$ to $QP_1+\Delta$. That is, before encoding the $i^{th}$ MB, the SATD of the coded 4×4 blocks of the remaining MBs in the frame for each different QP within $QP_1-\Delta$ to $QP_1+\Delta$ is computed as shown in Equation 18:

$$SATD_C(Qs) = \sum_{j=i}^{N_{MB}} SATD_C(Qs, j) \qquad [18]$$

where $N_{MB}$ is the number of MBs in the frame. Then, the $QP_2$ that gives a minimum distance between the available number of bits $R_{txt}$ and $R_{txt}(Qs)$ is identified as shown in Equation 19:

$$QP_{2,i} = \underset{q \in (QP_1-\Delta, QP_1+\Delta)}{\operatorname{argmin}} |R_{txt}(Qs(q)) - R_{txt}| \qquad [19]$$

After the $i^{th}$ MB is encoded using the second quantization parameter $QP_2$ at step 1010, the available number of bits $R_{txt}$ is updated by subtracting the actual texture bits of the $i^{th}$ MB. As in the previous embodiment, the $\Delta$ can be set to a value of 3 to ensure minimal coding gain loss.

Figure 17:
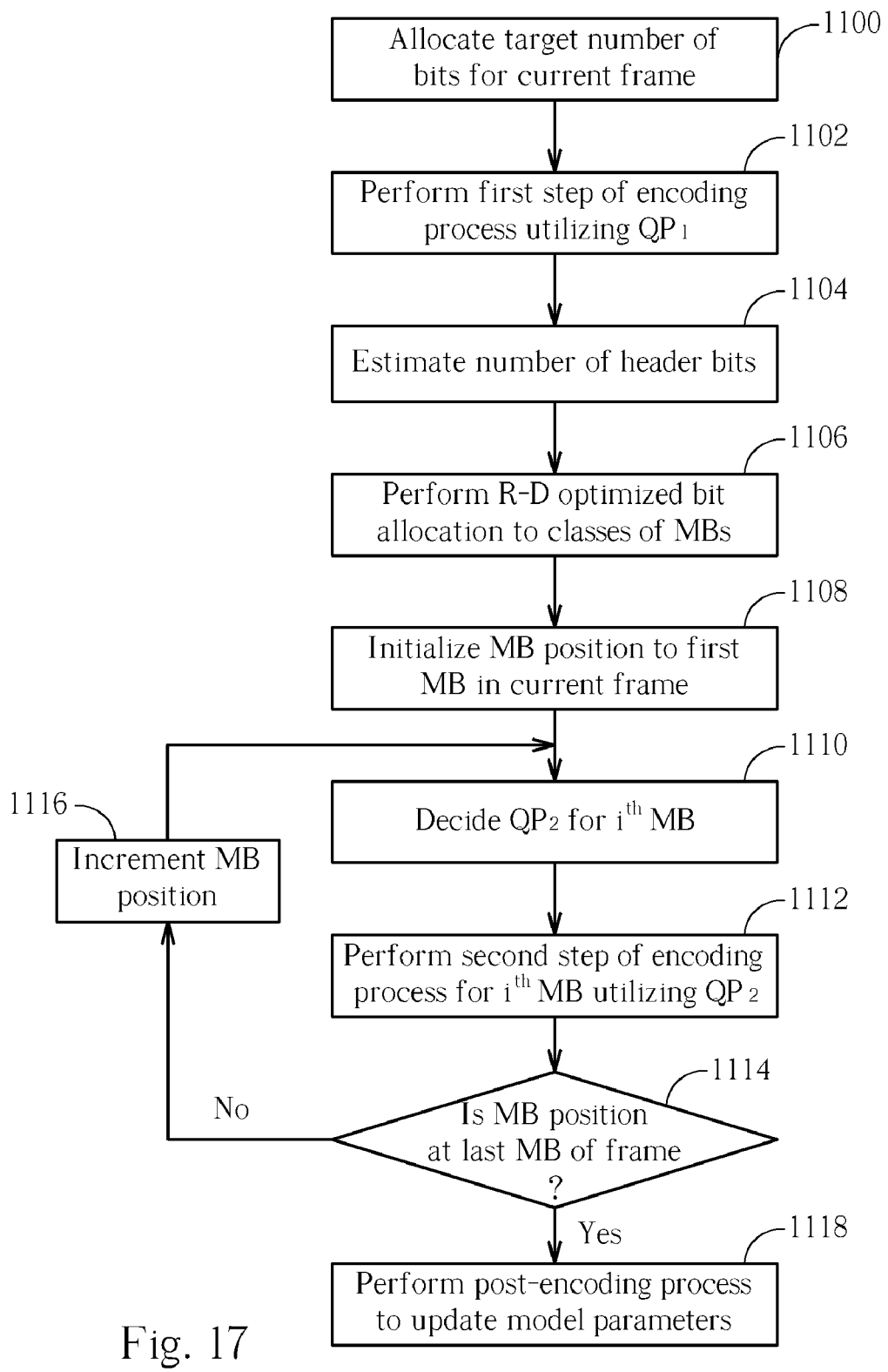
FIG. 17 illustrates a flowchart of a MB-layer rate control method with R-D optimized bit allocation based on a two-step encoding scheme according to a third exemplary embodiment of the present invention.

FIG. 17 illustrates a flowchart of a MB-layer rate control method based on a two-step encoding step with R-D optimized bit allocation according to another exemplary embodiment of the present invention. Provided that substantially the same result is achieved, the steps of the flowchart shown in FIG. 15 need not be in the exact order shown and need not be contiguous, that is, other steps can be intermediate. In this embodiment, the MB-layer rate control method with the R-D optimized bit allocation includes the following steps:

Step 1100: Allocate a target number of bits for current frame.

Step 1102: Perform the first step of the encoding process utilizing the first quantization parameter $QP_1$.

Step 1104: Estimate the number of header bits.

Step 1106: Perform R-D optimized bit allocation to classes of MBs.

Step 1108: Initialize a MB position to the first MB in the current frame.

Step 1110: Decide a second quantization parameter $QP_2$ for the $i^{th}$ MB.

Step 1112: Perform the second step of the encoding process for the $i^{th}$ MB utilizing the second quantization parameter $QP_2$.

Step 1114: Is the MB position the last MB of the frame? If yes, proceed to step 1016; otherwise, proceed to step 1014.

Step 1116: Increment the MB position to the next MB in the current frame.

Step 1118: Perform post-encoding process to update model parameters.

Comparing this embodiment with the previous MB-layer rate control method shown in FIG. 16, the major difference is the additional R-D optimized bit allocation step 1106. In this step, the MBs are classified into several classes and bits are allocated to each class for the purpose of R-D optimization. The MBs can be classified in many different ways. In one embodiment, the MBs being in a same row are grouped into a single class referred to as a group of blocks (GOB). Given the $N_C$ classes, the R-D optimized bit allocation is performed as follows: Let $SATD_{C,m}(Qs)$ be the SATD of the coded blocks of the $m^{th}$ classes as shown in Equation 20:

$$SATD_{C,m}(Qs) = \sum_{j \in m^{th}\,class} SATD_C(Qs, j) \qquad [20]$$

Next, let $R_m(Qs)$ be the rate of the $m^{th}$ class estimated by either Equation 9 or Equation 10, and let $D_m(Qs)$ be the distortion values of the $m^{th}$ class estimated by Equation 11, for which the distortion of the coded 4×4 blocks is estimated by either Equation 12 or Equation 13. For the optimal bit allocation, the $R_m(Qs)$ and $D_m(Qs)$ for the QP values from $QP_1-\Delta$ to $QP_1+\Delta$ are first estimated for all $N_C$ classes. Let $R_m$ be the allocated bits to the $m^{th}$ class, and let $q_m$ be the intermediate QP of the $m^{th}$ class. Then, the optimal bit allocation is performed according to a steepest gradient method using the following steps:

Step 1: Initialize $q_m=QP_1-\Delta$ and $Rm=Rm(Qs(qm))$ for $m=1, 2, \ldots , NC$ where $Qs(qm)$ is the quantizer step-size corresponding to the quantization parameter qm. Let R be the sum of Rm of all $m=1, 2, \ldots , NC$.

Step 2: Calculate equation 21 for m=1, 2, ..., NC and for k=qm+1, qm+2, ..., QP1+Δ, $$\lambda(m, k) = -\frac{D_m(Qs(q_m)) - D_m(Qs(k))}{R_m(Qs(q_m)) - R_m(Qs(k))} \quad [21]$$

Step 3: Determine values m' and k' which give the minimum value of λ(m, k) Step 4: Let qm'=k' and Rm'=Rm'(Qs (qm')) and update R.
Step 5: If R=Rtxt or qm=QP1+Δ for all m=1, 2, ..., NC, then stop.
Step 6: Repeat steps 2, 3, 4 and 5.
After the optimal bit allocation, the QP of the MB of each class is determined using the same method as in the embodiment of the MB-based rate control without the R-D optimized bit allocation, which is described in Equation 18 and Equation 19 and shown in FIG. 16. For example, for the $i^{th}$ MB, which is in the $m^{th}$ class, the SATD of the coded 4×4 blocks of the remaining MBs in the $m^{th}$ class is computed by summing $SATD_{C,m}(Qs)$ of the coded 4×4 blocks of the remaining MBs in the $m^{th}$ class. The number of texture bits required for encoding the remaining MBs in the $m^{th}$ class for each QP value within $QP_1-\Delta$ and $QP_1+\Delta$ can be determined by either Equation 9 or Equation 10. The $QP_2$ that gives a minimum distance between the available number of bits for the $m^{th}$ class $R_m$ and $R_m(Qs)$ is identified as shown in Equation 22:

$$QP_{2,i} = \underset{q \in (QP_1-\Delta, QP_1+\Delta)}{\operatorname{argmin}} |R_m(Qs(q)) - R_m| \quad [22]$$

After the $i^{th}$ MB is encoded using the second quantization parameter $QP_2$ in step 1012, the available number of bits for the $m^{th}$ class $R_m$ is updated by subtracting the actual texture bits of the $i^{th}$ MB. In this embodiment of the MB-layer rate control with the R-D optimized bit allocation, the value Δ can be set to a higher value such as 5 while still ensuring minimal coding gain loss.

Figure 18:
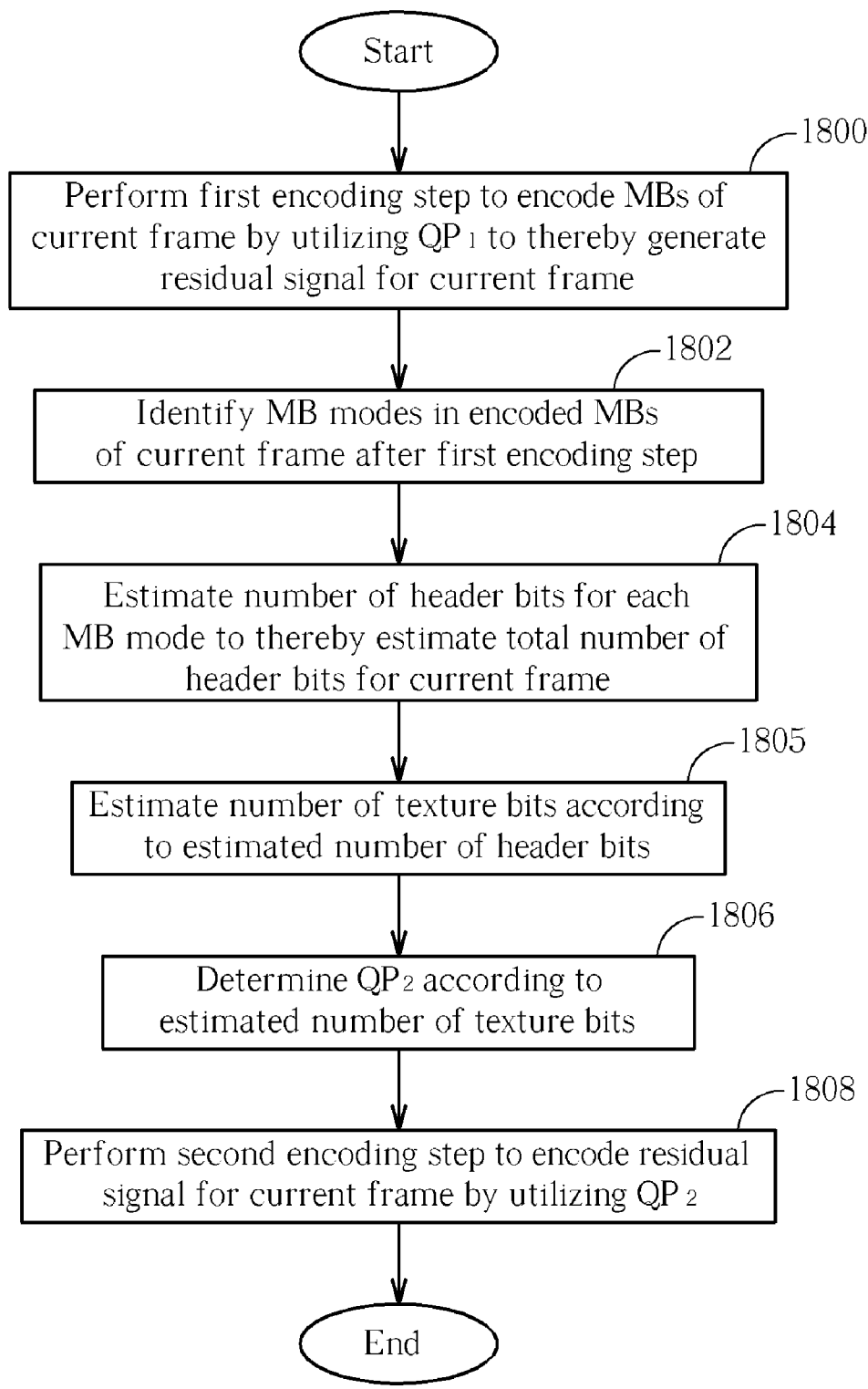
FIG. 18 illustrates a generalized flowchart of a rate control method based on a two-step encoding scheme according to a fourth exemplary embodiment of the present invention.

FIG. 18 illustrates a generalized flowchart of a rate control method based on a two-step encoding step according to another exemplary embodiment of the present invention. Provided that substantially the same result is achieved, the steps of the flowchart shown in FIG. 18 need not be in the exact order shown and need not be contiguous, that is, other steps can be intermediate. In this embodiment, the rate control method includes the following steps:

Step 1800: Perform a first encoding step to encode macroblocks of a current frame by utilizing a first quantization parameter to thereby generate a residual signal for the current frame.

Step 1802: Identify a plurality of block modes in the encoded macroblocks of the current frame after the first encoding step.

Step 1804: Estimate a number of header bits for each macroblock mode to thereby estimate a total number of header bits for the current frame.

Step 1805: Estimate a number of texture bits for the current frame according to the estimated total number of header bits and a number of bits allocated for the frame.

Step 1806: Determine a second quantization parameter according to the estimated available number of texture bits and texture rate and distortion models.

Step 1808: Perform a second encoding step to encode the residual signal for the current frame by utilizing the second quantization parameter.

The RDO for all MBs in a current frame is performed using an average quantization parameter (QP) of the previous frame, and the residual signals of all MBs are finally encoded using a new QP obtained by texture rate and distortion models after header bit estimation by the header rate model. In this way, more accurate rate control is possible. In particular, a MB-layer rate control algorithm based on a two-step encoding scheme, in which the header bits are estimated differently according to the macroblock modes while the texture bits and distortion are estimated by texture rate model and distortion model, respectively, is disclosed to allow precise rate control and increased picture overall quality.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of rate control in a video encoder comprising:
utilizing the video encoder to perform a first encoding step to encode macroblocks of a current frame by utilizing a first quantization parameter to thereby generate a residual signal for the current frame;
utilizing the video encoder to estimate a number of header bits for each macroblock mode according to the residual signal to thereby estimate a total number of header bits for the current frame;
utilizing the video encoder to estimate an available number of texture bits according to the total number of header bits for the current frame;
utilizing the video encoder to determine a second quantization parameter according to the estimated available number of texture bits;
utilizing the video encoder to perform a second encoding step to encode the residual signal for the current frame by utilizing the second quantization parameter
allocating a total number of target bits to the current frame;
determining a number of texture bits according to the total number of target bits and the estimated total number of header bits for the current frame; and
determining the second quantization parameter according to rate and distortion values of a rate and distortion optimization process and the number of texture bits
identifying coded blocks in the encoded macroblocks of the current frame after the first encoding step;
modeling distortion for the coded blocks to generate an estimated distortion for the coded blocks; and
modeling the number of texture bits for the current frame to generate the estimated number of bits for the coded blocks.

2. The method of claim 1, wherein the macroblock modes comprise inter prediction for inter-coded blocks and intra prediction for intra-coded blocks, and estimating the number of header bits is performed separately for inter-coded blocks and intra-coded blocks.

3. The method of claim 2, further comprising estimating a number of header bits for inter-coded blocks according to a linear model of a number of non-zero motion vector elements and a number of motion vectors in the current frame.

4. The method of claim 2, further comprising estimating a number of header bits for intra-coded blocks by averaging the number of header bits of the intra-coded blocks of previous frames.

5. The method of claim 2, further comprising constructing a first reconstructed frame in the first encoding step for intra prediction of subsequent macroblocks.

6. The method of claim 2, further comprising constructing a second reconstructed frame in the second encoding step for inter prediction of subsequent frames.

7. The method of claim 1, further comprising obtaining header information after the first encoding step, wherein the header information contains information relates to one or a combination of reference frames, motion vectors, and macroblock modes.

8. The method of claim 1, further comprising determining the first quantization parameter by averaging the quantization parameters for all macroblocks in a previous frame.

9. The method of claim 1, further comprising ensuring the second quantization parameter is within a predetermined range of the first quantization parameter.

10. The method of claim 1, wherein the number of texture bits is estimated based on a complexity measure of the coded blocks.

11. The method of claim 1, wherein the coded blocks are identified from blocks being the basic unit of a discrete cosine transform (DCT) utilized during the first encoding step.

12. The method of claim 1, further comprising estimating distortion of skipped blocks being non-coded blocks in the encoded macroblocks of the current frame according to the residual signal for the current frame.

13. The method of claim 1, further comprising:
determining the second quantization parameter individually for each macroblock in the current frame; and
performing the second encoding step to individually encode the residual signal for each macroblock in the current frame utilizing a corresponding second quantization parameter determined for each macroblock.

14. The method of claim 13, further comprising allocating an adequate number of bits to each class thereby optimize a rate and distortion process for each class of MBs.

15. The method of claim 14, wherein the macroblock classes are grouped by a group of blocks being formed by macroblocks in the same row.

16. The method of claim 14, wherein allocating an adequate number of bits to each macroblocks class further comprises:
calculating a plurality of rate and distortion estimations corresponding to a plurality of quantization parameter values being within a predetermined range of the first quantization parameter; and
choosing the adequate number of bits for each macroblock class that optimizes the rate and distortion values by maximizing a rate decrease while minimizing a distortion increase.

17. The method of claim 1, wherein the rate control method is used by an H.264 video encoder.

18. A system for performing rate control in a video encoder comprising:
a first step encoding device being coupled to an incoming video source for performing a first encoding step to encode macroblocks of a current frame by utilizing a first quantization parameter to thereby generate a residual signal for the current frame;
a rate control device being coupled to the first step encoding device for estimating a number of header bits for each macroblock mode according to the residual signal to thereby estimate a total number of header bits for the current frame, estimating an available number of texture bits according to the total number of header bits, and determining a second quantization parameter according to the estimated available number of texture bits; and
a second step encoding device being coupled to the rate control device for performing a second encoding step to encode the residual signal for the current frame by utilizing the second quantization parameter
wherein the rate control device comprises a bit allocation unit for allocating a total number of target bits to the current frame, and determining a number of texture bits according to the total number of target bits and the estimated total number of header bits for the current frame; and a second quantization parameter decision unit for determining the second quantization parameter according to rate and distortion values of a rate and distortion optimization process and the available number of texture bits and the rate control device is further for identifying coded blocks in the encoded macroblocks of the current frame after the first encoding step, modeling distortion for the coded blocks to generate an estimated number of texture bits for the coded blocks, and determining the number of texture bits for the current frame further according to the estimated number of texture bits for the coded blocks.

19. The system of claim 18, wherein the plurality of macroblock modes comprises inter-coded blocks and intra-coded blocks, and the rate control device comprises a header bit estimation unit for estimating the number of header bits is performed separately for inter-coded blocks and intra-coded blocks.

20. The system of claim 19, wherein the header bit estimation unit is further for estimating a number of header bits for inter-coded blocks according to a linear model of a number of non-zero motion vector elements and a number of motion vectors in the current frame.

21. The system of claim 19, wherein the header bit estimation unit is further for estimating a number of header bits for intra-coded blocks by averaging the number of header bits of the intra-coded blocks of previous frames.

22. The system of claim 18, wherein the first step encoding device is further for constructing a first reconstructed frame for intra prediction of subsequent macroblocks.

23. The system of claim 18, wherein the second step encoding device is further for constructing a second reconstructed frame for inter prediction of subsequent frames.

24. The system of claim 18, wherein the rate control device is further for obtaining header information after the first encoding step, wherein the header information contains information relates to one or a combination of reference frames, motion vectors, and macroblock modes.

25. The system of claim 18, wherein the first step encoding device is further for determining the first quantization parameter by averaging the quantization parameters for all macroblocks in a previous frame.

26. The system of claim 18, wherein the rate control device comprises a second quantization parameter decision unit for choosing the second quantization parameter and ensuring the second quantization parameter is within a predetermined range of the first quantization parameter.

27. The system of claim 18, wherein the coded blocks are identified from blocks, which is the basic unit of DCT, during the first encoding step.

28. The system of claim 18, wherein the rate control device is further for estimating a distortion of skipped blocks being non-coded blocks in the encoded macroblocks of the current frame after the first encoding step according to the residual signal for the current frame.

29. The system of claim 18, wherein the rate control device comprises a second quantization parameter decision unit for determining the second quantization parameter individually for each macroblock in the current frame; wherein the second step encoding device is further for performing the second encoding step to individually encode the residual signal for each macroblock in the current frame utilizing a corresponding second quantization parameter determined by the second quantization parameter decision unit for each macroblock.

30. The system of claim 18, wherein the rate controller comprises a rate and distortion optimized bit allocation unit for allocating an adequate number of bits to each class of a plurality of macroblock classes to thereby optimize a rate and distortion process for each macroblock according to the adequate number of bits allocated for each macroblock.

31. The system of claim 3, wherein the plurality of macroblock classes comprises a group of block being formed by macroblocks of a same row being grouped together in a same macroblock class.

32. The system of claim 30, wherein when allocating an adequate number of bits to each class of macroblocks classes, the rate and distortion optimized bit allocation unit is further for calculating a plurality of residual bits and distortion bits according to a plurality of different quantization parameters being within a predetermined range of the first quantization parameter, and choosing the adequate number of bits for each class of macroblocks from the plurality of residual bits and distortion bits to maximize a rate decrease or minimize a distortion increase.

33. The system of claim 18, being utilized to provide rate control for an H.264 video encoder.

34. The system of claim 18, wherein the first step encoding device further comprises:
a rate distortion optimization (RDO) unit being coupled to the incoming video source for performing rate and distortion optimized motion estimation and mode decision utilizing the first quantization parameter for all macroblocks in the current frame;
a residual signal storage unit for storing the residual signal and the header information including motion vectors and reference frames obtained from the RDO unit;
a discrete cosine transform (DCT) and quantization unit for performing a DCT to reconstruct each macroblock and for intra prediction of next macroblocks and performing quantization utilizing the first quantization parameter;
a coded block decision unit for identifying coded blocks having quantization parameters being within a predetermined range of the first quantization parameter while performing the DCT;
an inverse DCT and inverse quantization (IQ) unit for reconstructing each frame for intra prediction of the next macroblocks; and
a first reconstructed frame storage for storing the first reconstructed frame.

35. The system of claim 18, wherein the second step encoding device comprises:
a selective intra refinement unit being activated only when a macroblock mode of the current macroblock is set to intra prediction mode, wherein the residual signal of intra MB is refined in the second step encoding device using the intra mode determined in the first step encoding device;
a DCT and quantization (Q) unit for performing a DCT to reconstruct each macroblock and for intra prediction of next macroblocks and performing quantization utilizing the second quantization parameter
a second reconstructed frame storage for storing the second reconstructed frame;
an inverse DCT and inverse quantization (IQ) unit for reconstructing each frame after intra prediction of the next macroblocks; and
an entropy coding unit for generating an output bit-stream.

36. The system of claim 18, wherein the rate control device further comprises:
a bit allocation unit for allocating an adequate number of bits for each frame according to a predefined set of parameters;
a header bit estimation unit for estimating the required number of header bits for all macroblocks, wherein the available texture bits are computed by estimating the number of header bits given the total allocated number of bits to the frame;
an R-D modeling unit for estimating rate and distortion values for a set of quantization parameters being within a predetermined range of the first quantization parameter;
an R-D optimized bit allocation unit for allocating the adequate number of bits to each macroblock class; and
a QP2 decision unit for determining the second quantization parameter for use by the second step encoding device according to the rate and distortion values estimated by the R-D modeling unit.

* * * * *